United States Patent [19]
Verstrate et al.

[11] Patent Number: 6,110,880
[45] Date of Patent: Aug. 29, 2000

[54] POLYOLEFIN BLOCK COPOLYMER VISCOSITY MODIFIER

[75] Inventors: Gary William Verstrate, Port St. Lucie, Fla.; Charles Cozewith, Bellaire, Tex.; Thomas John Pacansky, Bernardsville; William Myers Davis, Westfield, both of N.J.; Pratima Rangarajan, Schenectady, N.Y.

[73] Assignee: Exxon Chemical Patents Inc, Linden, N.J.

[21] Appl. No.: 08/881,171

[22] Filed: Jun. 24, 1997

[51] Int. Cl.[7] .................................................. C10M 143/00
[52] U.S. Cl. .......................... 508/591; 585/12; 525/314; 525/246; 525/249
[58] Field of Search .............................. 508/591; 585/12; 525/246, 249, 314

[56] References Cited

U.S. PATENT DOCUMENTS

| | | |
|---|---|---|
| 3,378,606 | 4/1968 | Kontos . |
| 4,540,753 | 9/1985 | Cozewith et al. . |
| 4,716,207 | 12/1987 | Cozewith et al. . |
| 4,804,794 | 2/1989 | Ver Strate et al. . |
| 4,882,406 | 11/1989 | Cozewith et al. . |
| 4,900,461 | 2/1990 | Ver Strate et al. . |
| 4,959,436 | 9/1990 | Cozewith et al. . |
| 5,030,695 | 7/1991 | Cozewith et al. . |

FOREIGN PATENT DOCUMENTS

| | | |
|---|---|---|
| 0 129 414 A3 | 12/1984 | European Pat. Off. . |
| 0 299 608 A1 | 1/1989 | European Pat. Off. . |
| 1175670 | 12/1969 | United Kingdom . |
| WO 91/12285 | 8/1991 | WIPO . |
| WO 95/27745 | 10/1995 | WIPO . |
| WO 95/27746 | 10/1995 | WIPO . |

*Primary Examiner*—Jacqueline V. Howard

[57] ABSTRACT

A viscosity modifier comprising a low molecular weight block copolymer including A blocks and B blocks, wherein the A blocks comprise at least about 93 wt. % polyethylene and the B blocks comprise a copolymer of between about 40 wt. % to 75 wt. % ethylene and at least one other α-olefin; wherein the resulting block copolymer has an average ethylene content of between about 60 wt. % to 80 wt. %.

19 Claims, 8 Drawing Sheets

POLYOLEFIN BLOCK COPOLYMER VISCOSITY MODIFIER

The present invention relates to novel block copolymers particularly useful as oil viscosity modifiers that display an improved balance of thickening efficiency and shear stability. These block copolymers comprise blocks of substantially pure polyethylene, and blocks of copolymers containing ethylene and at least one other α-olefin. Lubricating oils containing the unique viscosity modifiers and the process for producing the block copolymers are also provided.

BACKGROUND OF THE INVENTION

Ethylene-propylene copolymers are important commercial products and are widely used as viscosity modifiers (VM) in lubricating oils. A motor oil should not be too viscous at low temperatures so as to avoid serious frictional losses, facilitate cold starting, and provide free oil circulation at engine start-up. On the other hand, too thin an oil at high temperature will cause excessive engine wear and oil consumption. It is most desirable to employ a lubricating oil which experiences little or no viscosity change in response to changes in oil temperature.

Over the last thirty years, efforts have been made to improve the thickening efficiency (TE) and shear stability (SSI) performance of lubricating oil viscosity modifiers. The thickening efficiency is a measure of the thickening power of the polymer, and is defined as:

$$TE=(2/C) \ln ((kv \text{ of polymer+oil})/(kv \text{ of oil}))/\ln (2)$$

wherein kv is the kinematic viscosity at 100° C., C is the concentration in grams/100 grams of solution, and the log is consistently either natural or base 10.

The TE of a viscosity modifier depends somewhat on the particular base oil and other formulating components in the base oil, as well as the polymer concentration. For the purposes of this application, the oil is designated to be a solvent 100N, such as FTN135 (a product of Exxon Chemicals) containing no components other than the viscosity modifier of the present invention, with a polymer concentration sufficient to double the viscosity of the base oil at 100° C.

The shear stability is a measure of how well the polymer resists degradation due to the mechanical stresses applied by an engine. The SAE-ASTM-DIN test used to measure this tendency for degradation is the Kurt Orbahn Shear Stability Test (ASTM D3945-86, hereinafter "KO SSI").

Previous efforts to simultaneously improve TE and SSI of ethylene, α-olefin copolymers have involved increasing the ethylene content of the polymer and narrowing the molecular weight distribution (MWD). The upper limit for ethylene content is determined by the requirement that the dilute polymer has to be soluble, or remain in suspension with no macroscopic gellation,in oil down to a temperature of at least −40° C. Thus, pure polyethylene is beyond the limit. For simple statistical copolymers, the average ethylene content cannot be made higher than about 76 wt. % (determined in accordance with ASTM D3900-95) without causing the copolymer to become insoluble in oil. At these levels, however, pour point problems are encountered. However, it has been demonstrated that even when the ethylene content exceeds only about 61 wt. %, many of the methylene sequences in the viscosity modifier are of a length which allows them to co-crystallize with paraffin waxes in the oil, thereby leading to undesirably high viscosities and gellation of the oil. Typically, conventional ethylene, α-olefin viscosity modifiers that can be employed to formulate lubricating oils having pour points of −30° C. or below are restricted to an average ethylene content of no greater than about 56 wt. %, unless the molecules possess an intramolecular compositional distribution (CD) tailored to improve such properties, as is disclosed in U.S. Pat. No. 4,900,461.

The present inventors have developed a unique viscosity modifier, formed of a block copolymer comprising a first block of substantially pure polyethylene and a second block of a copolymer of ethylene and another α-olefin; such that the block copolymer has a high average ethylene content so as to provide an excellent balance of thickening efficiency and shear stability. More importantly, however, is the fact that this unique block copolymer viscosity modifier of the present invention possesses unusual solubility characteristics, agglomerating above wax crystallization temperatures, thereby preventing its co-crystallizing with paraffin waxes in the oil and the undesirable formation of high viscosities or gellation of the oil. Furthermore, the present inventors have discovered that when blocks of substantially pure ethylene are used as the A block of a block copolymer, the ethylene sequences in the B block, even in the 50 wt. % range of B block ethylene content, will not crystallize with paraffins and cause high oil viscosity at temperatures below about 0° C. This allows for an increased ethylene content in the B blocks, an average ethylene content in the block copolymer of over 70 wt. % and performance characteristics that are substantially independent of the type of wax contained in the lubricant basestock.

In summary, these viscosity modifiers exhibit excellent TE-SSI performance, and can be added to the oils to form a viscosity modified lubricant with excellent low temperature properties.

The present invention also provides a polymer with resistance to cold flow during storage and resistance to agglomerization during recovery from the polymerization solvent and many additional advantages which shall become apparent as described below.

SUMMARY OF THE INVENTION

The present invention is directed to a novel viscosity modifier comprising a block copolymer including an A block and B block. The A block comprises at least about 93 wt. % polyethylene. The B block comprises a copolymer of between about 40 wt. % to 85 wt. % ethylene and at least one other α-olefin. These block copolymers have a total average ethylene content of between about 60 wt. % to 80 wt. % and provide a viscosity modifier exhibiting the following properties: TE equal to or greater than 1.5, preferably between about 2.0 to 4.0; KO SSI less than 30, preferably between about 10 and 30; formulated oil pour points less than −25° C., as specified by oil grade; and an undiluted polymer melting point that is preferably greater than 112° C., as measured by the maximum departure from baseline in a differential scanning calorimeter (DSC), using the DSC operating conditions described below.

The semicrystalline viscosity modifiers of the present invention are also novel in that the methylene sequences therein are of sufficient length, and in sufficient concentration such that in the bulk polymer, crystalline lamallae with dimensions greater than 0.5 microns are observed by transmission electron microscopy (TEM) with ruthenium tetroxide ($RuO_4$) treatment to produce contrast.

Preferably, the viscosity modifier will have a weight average molecular weight of between about 60,000 to about 150,000 and a bulk viscosity (pure polymer, no diluent) that is greater than $10^6$ poise at 110° C. when measured at a shear strain rate of $10^{-3}$ sec$^{-1}$ or less, and will be formed with a B block comprising a copolymer of ethylene and propylene.

Preferably, the A block will comprise less than about 25 wt. % of said block copolymer. Such a block copolymer can provide a viscosity modifier exhibiting an SSI as defined by the following formula:

log SSI=$a$logTE+$b$(max in dI(M)/$d$log M)+$c$ wherein:
a=1.8
b=0.29
c=1.2
I(M)=integral molecular weight distribution wherein $$\int_{M=1}^{\infty} dI(M)/d\log M; d\log M = 1 \text{ and}$$

M=molecular weight

SSI performance depends on TE, ethene content, and molecular weight distribution (MWD). The above formula defines a TE-SSI performance that has heretofore not been attainable with ethene-α-olefin polymers meeting all other performance criteria for conventional lube oil viscosity modifiers.

The present invention also includes lubricant compositions prepared from at least one synthetic or natural oil base stock and the above defined viscosity modifier. The lubricant is preferably one selected from the group consisting of crankcase oils, hydraulic fluids, turbine oils, gear oils, functional fluids, industrial oils and catapult oils. A particularly advantageous crankcase lubricant can be provided by adding to a synthetic oil and/or natural oil base stock, the unique viscosity modifier of the present invention wherein the A block comprises 15 to 25 wt. % of the block copolymer. This viscosity modifier can provide the formulated oil with a combination of a High Temperature High Shear viscosity (HTHS) value and a low kinematic viscosity (kv) at 80° C. that will promote fuel economy. The Viscosity Index, as measured by ASTM D2270-93, is exceptionally high for oils formulated with the PE-EP block copolymers of the present invention, with values in excess of 170 being readily attainable.

The present invention also provides a novel process for forming the above-described block copolymer viscosity modifiers, in which the block copolymer is formed in a mix-free reactor, in the presence of a vanadium catalyst system including a vanadium compound and an organoaluminum compound.

DESCRIPTION OF THE PREFERRED EMBODIMENTS

Figure 1:
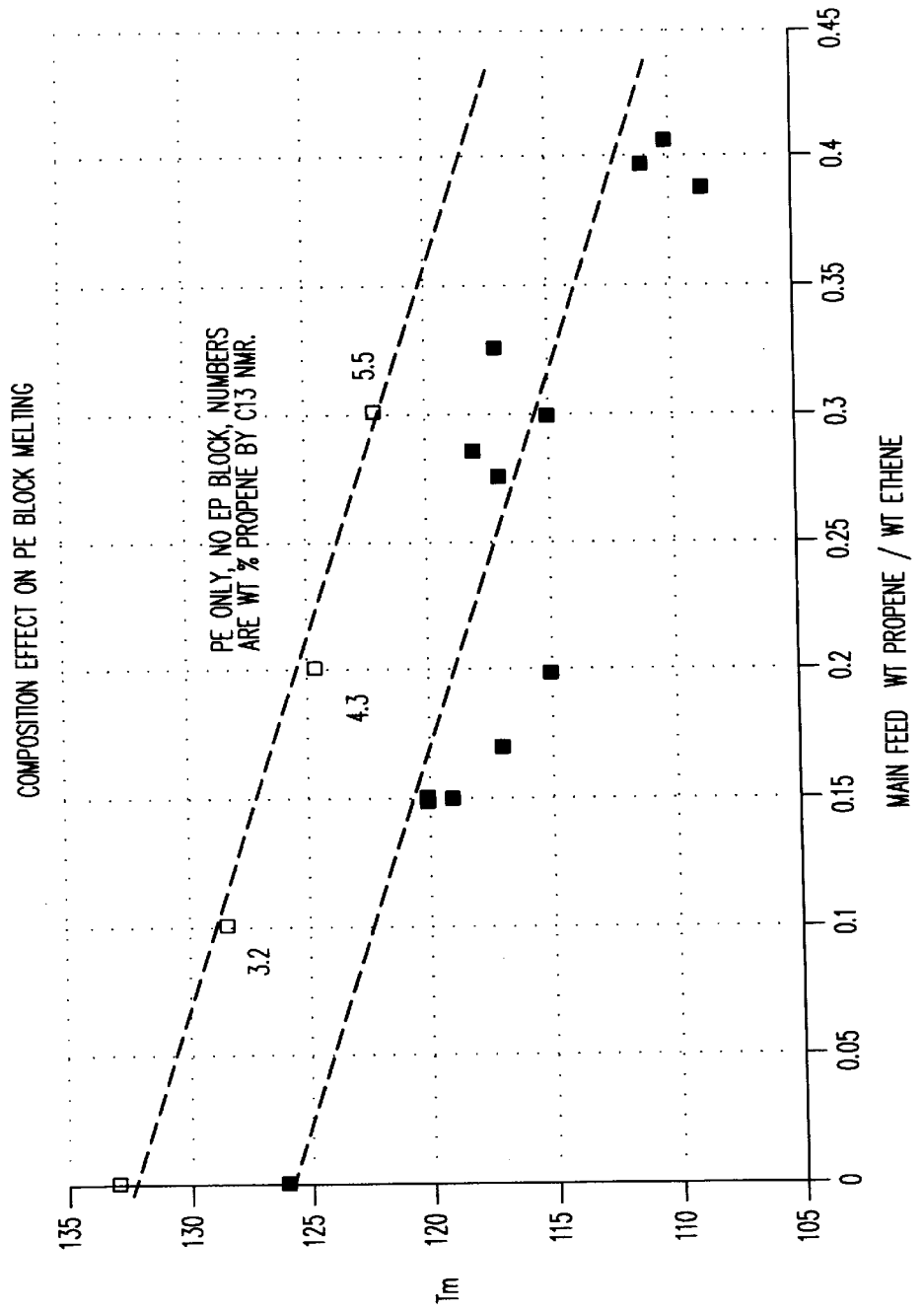
FIG. 1 shows a plot of $T_m$ v. the ratio of propene to ethene in the main feed, as discussed in Example 4.

The present invention is directed to a novel viscosity modifier comprising a block copolymer including A blocks and B blocks. The A blocks comprise at least about 93 wt. % ethylene. The B blocks comprise a copolymer of between about 40 wt. % to 85 wt. % ethylene and at least one other α-olefin. These block copolymers have an average ethylene content of between 60 wt. % to 80 wt. % and provide a viscosity modifier exhibiting the following properties: TE equal to or greater than about 1.3, preferably between about 2.0 to 4.0; KO SSI less than about 30 and an undiluted polymer melting point greater than about 112° C., preferably between about 112° C. to 118° C. Formulated oils comprising the novel viscosity modifier can provide a pour point less than about −30° C., while simultaneously providing exceptional TE-SSI performance that results from a high average ethene content and a narrow molecular weight distribution (MWD).

The A block comprises about 93 wt. % polyethylene. The remainder of the A block comprises an α-olefin comonomer. The A block is preferably present in the block copolymer in the range of between about 10 to 30 wt. %. More preferably, the A block will be present in the block copolymer in the range of between about 14 to 25 wt. %, most preferably in the range of 16 to 22 wt. %. The upper bound is dictated by the need for oil solubility, especially after the polymer chains are mechanically broken by forces within the engine. The lower bound is dictated by the requirement that the polymer form particles in a hot water slurry during the polymer manufacturing process.

The B block comprises a copolymer of ethylene and at least one other α-olefin. This other α-olefin is one having between about about 3 to 8 carbon atoms, e.g., propylene, butene-1, pentene-1, etc. For economic and TE-SSI performance reasons, α-olefins having between about 3 to 6 carbon atoms are preferred. The most preferred α-olefin is propylene. The use of propylene as the α-olefin of the B block provides for the highest weight % ethylene content. The B block can comprise an average ethylene content in the range between about 40 to 90 wt. %, preferably 50 to 85 wt. % and most preferably 60 to 80 wt. %.

The block copolymer will have an average ethylene content of between about 60 to 80 wt. %, preferably 65 to 75 wt. %, and most preferably 68 to 73 wt. %. These block copolymers will have a weight average molecular weight in the range between about 50,000 to 150,000, preferably 80,000 to 130,000. The block copolymers of the present invention will have a melting point in the range between about 110° C. to 125° C., preferably 114° C. to 118° C. Further, these block copolymers will contain methylene sequences that are of sufficient length, and in sufficient concentration such that, at 20° C., the bulk polymer will contain crystalline lamallae with dimensions greater than 0.5 microns when examined by transmission electron microscopy (TEM) with ruthenium tetroxide ($RuO_4$) treatment, as described, for example, by Khandpur et al. in "Transmission Electron Microscopy of Saturated Hydrocarbon Block Copolymers", Journal of Polymer Science: Part B: Polymer Physics, Vol. 33, 247–252 (1995), which is incorporated herein by reference.

The novel viscosity modifier of the present invention has a thickening efficiency of greater than about 1.5, preferably 1.5 to 4.0, and most preferably 2.0 to 3.5. When the viscosity modifier of the present invention is added to a base stock lubricant, the pour point of the resulting composition remains below about −25° C., preferably below −30° C., and most preferably below −33° C., depending on the SAE grade specified.

Previously, statistical copolymers of ethylene and propylene, when used as viscosity modifiers, have displayed low temperature performance characteristics that depended strongly on the average ethene content of the polymer. Pour points (PP) and minirotary viscosity (MRV) measurements in the TP1 temperature cycle have indicated poor performance in finished lubricating oils when the ethene content of the copolymer was above about 55 wt. %. The only exception has been found in the performance of intramolecularly tapered molecules, as described in U.S. Pat. No. 4,900,461. However, even in that case of these tapered molecules, satisfactory performance is only observed over a narrow range of ethene content and degree of crystallinity, in the semi-crystalline portion of the molecule.

Surprisingly, it has been found that the degree of crystallinity (at 20 to 25° C.) in the semicrystalline portion of the ethylene-propylene portion of the molecule in the B block can be varied over a wide range (e.g. from 0 to at least 20 wt %), with little effect on the pour point or TP1 viscosity. This characteristic of the copolymers of the present invention is beneficial, as it allows for the use of a reduced amount of wax crystal modifier (LOFI) in the formulated lubricant composition. Heats of fusion of the semicrystalline ethylene-propylene section of the inventive copolymers are within a range of about 0 to about 25 J/gm of polymer.

Although applicants do not wish to be bound by any specific theory, it can be deduced from the foregoing that the polyethylene portion of the copolymer, which has a melting point far above that of the semicrystalline ethylene-propylene segment, controls the configuration and solubility of the copolymer molecule, in the basestock. At low temperatures at which wax crystallizes, below 10° C., the viscosity modifier polymer has already crystallized into too small a configuration to interact with the wax in a manner that will raise the viscosity or pour point of the lubricating composition. This is easily observed as a decrease in the contribution of the polymer to oil viscosity as the temperature is lowered.

It is critical that the PE-EP block structure not contain sequences of ethene in the EP block that are of high enough melting point that they will cocrystallize with the PE block. In such a case, the polymer can crystallize into a network that will gel the oil at high temperatures even before the wax crystallizes. Thus, the melting point of any ethane sequences in the EP block must be at least 30 to 40° C. below that of the PE block. It is also advantageous to have the crystalline portion, if any, of the EP block be adjacent to the PE block rather than at the end of the EP block that is furthest from the juncture between the PE and EP blocks. The present polymers are designed to avoid network formation and are thus not suitable for use as thermoplastic elastomers. In terms of ethene content, the EP block should not contain any segments of 5000 molecular weight or higher that have an ethene content above 80 wt. %.

The formulated lubricant according to the present invention comprises a base stock selected from the group consisting of: mineral oils, highly refined mineral oils, alkylated mineral oils, poly alpha olefins, polyalkylene glycols, diesters and polyol esters, and a viscosity modifying present in an amount between about 0.4 wt. % to 1.8 wt. %, preferably 0.5 wt. % to 1.5 wt. %, and most preferably 0.6 wt. % to 1.4 wt. %. The lubricant composition may further contain other lubricant additives.

CRANKCASE LUBRICATING OILS

The inventive viscosity modifier composition can be used in the formulation of crankcase lubricating oils (i.e., passenger car motor oils, heavy duty diesel motor oils, and passenger car diesel oils) for spark-ignited and compression-ignited engines. The additives listed below are typically used in such amounts so as to provide their normal attendant functions. Typical amounts for individual components are also set forth below. All the values listed are stated as mass percent active ingredient.

| ADDITIVE | MASS % (Broad) | MASS % (Preferred) |
|---|---|---|
| Ashless Dispersant | 0.1–20 | 1–8 |
| Metal detergents | 0.1–15 | 0.2–9 |
| Corrosion Inhibitor | 0–5 | 0–1.5 |
| Metal dihydrocarbyl dithiophosphate | 0.1–6 | 0.1–4 |
| Supplemental anti-oxidant | 0–5 | 0.01–1.5 |
| Pour Point Depressant | 0.01–5 | 0.01–1.5 |
| Anti-Foaming Agent | 0–5 | 0.001–0.15 |
| Supplemental Anti-wear Agents | 0–0.5 | 0–0.2 |
| Friction Modifier | 0–5 | 0–1.5 |
| Viscosity Modifier | 0.5–1.8 | 0.9–1.4 |
| Synthetic and/or Mineral Base Stock | Balance | Balance |

The individual additives may be incorporated into a base stock in any convenient way. Thus, each of the components can be added directly to the base stock by dispersing or dissolving it in the base stock at the desired level of concentration. Such blending, in general, will occur at an elevated temperature. To dissolve the block copolymers herein, the base oil and viscosity modifiers should be heated to above 110° C. to facilitate dissolution. With high shear mixers, however, the block copolymers can be dissolved at a lower temperature.

Preferably, all the additives except for the viscosity modifier and the pour point depressant are blended into a concentrate or additive package described herein as the additive package, that is subsequently blended with the base stock and viscosity modifier to make finished lubricant. Use of such concentrates is conventional. The concentrate will typically be formulated to contain the additive(s) in proper amounts to provide the desired concentration in the final formulation when the concentrate is combined with a predetermined amount of base lubricant. Storage and blending of the block copolymer concentrate should be carried out at a temperature of 60° C. or higher, as determined by the polymer concentration and $T_m$.

The final crankcase lubricating oil formulation may employ from 2 to 20 mass % and preferably 5 to 10 mass %, typically about 7 to 8 mass % of the concentrate with the remainder being base stock and additive package.

The ashless dispersant comprises oil soluble polymeric hydrocarbyl groups bearing functional groups that are capable of associating with particles to be dispersed. Typically, the dispersants comprise amine, alcohol, amide, or ester polar moieties attached to the hydrocarbyl group, often via a bridging group. The ashless dispersant may be, for example, selected from oil soluble salts, esters, aminoesters, amides, imides, and oxazolines of long chain hydrocarbon substituted mono and dicarboxylic acids or their anhydrides; thiocarboxylate derivatives of long chain hydrocarbons; long chain aliphatic hydrocarbons having a polyamine attached directly thereto; and Mannich condensation products formed by condensing a long chain substituted phenol with formaldehyde and polyalkylene polyamine.

Metal-containing or ash-forming detergents function both as detergents to reduce or remove deposits and as acid neutralizers or rust inhibitors, thereby reducing wear and corrosion and extending engine life. Detergents generally comprise colloids which are 75 Å to 500 Å particles of alkali and alkaline earth carbonates. These colloids are stabilized by other small molecule detergents comprising a polar head with long hydrophobic tail, with the polar head comprising a salt of an organic acid compound. The salts may contain a substantially stoichiometric amount of the metal in which they are usually described as normal or neutral salts, and would typically have a total base number (TBN), as may be measured by ASTM D-2896 of from 0 to 80. It is possible to include large amounts of a metal base by reacting an excess of a metal compound such as an oxide or hydroxide with an acid gas such as carbon dioxide. When small molecule detergents are added to stabilize the colloid, the resulting overbased detergent comprises neutralized detergent as the outer layer of a metal base (e.g., carbonate) micelle. Such overbased detergents may have a TBN of 150 or greater, and typically from 250 to 450 or more.

Detergents that may be used include oil-soluble neutral and overbased sulfonates, phenates, sulfurized phenates, thiophosphonates, salicylates, and naphthenates and other oil-soluble carboxylates of a metal, particularly the alkali or alkaline earth metals, e.g., sodium, potassium, lithium, calcium, and magnesium. The most commonly used metals are calcium and magnesium, which may both be present in detergents used in a lubricant, and mixtures of calcium and/or magnesium with sodium. Particularly convenient metal detergents are neutral and overbased calcium sulfonates having TBN of from 20 to 450, and neutral and overbased calcium phenates and sulfurized phenates having TBN of from 50 to 450.

Oxidation inhibitors or antioxidants reduce the tendency of base stocks to deteriorate in service which deterioration can be evidenced by the products of oxidation such as sludge and varnish-like deposits on the metal surfaces and by viscosity growth. Such oxidation inhibitors include hindered phenols, alkaline earth metal salts of alkylphenolthioesters having preferably $C_5$ to $C_{12}$ alkyl side chains, arylamines, calcium nonylphenol sulfide, ashless oil soluble phenates and sulfurized phenates, phosphosulfurized or sulfurized hydrocarbons, phosphorous esters, metal thiocarbamates, oil soluble copper compounds as described in U.S. Pat. No. 4,867,890, and molybdenum containing compounds.

Friction modifiers may be included to improve fuel economy. Oil-soluble alkoxylated mono- and di-amines are well known to improve boundary layer lubrication. The amines may be used as such or in the form of an adduct or reaction product with a boron compound such as a boric oxide, boron halide, metaborate, boric acid or a mono-, di- or tri-alkyl borate.

Other friction modifiers are known. Among these are esters formed by reacting carboxylic acids and anhydrides with alkanols. Other conventional friction modifiers generally consist of a polar terminal group (e.g. carboxyl or hydroxyl) covalently bonded to an oleophillic hydrocarbon chain. Esters of carboxylic acids and anhydrides with alkanols are described in U.S. Pat. No. 4,702,850. Examples of other conventional friction modifiers are described by M. Belzer in the "Journal of Tribology" (1992), Vol. 114, pp. 675–682 and M. Belzer and S. Jahanmir in "Lubrication Science" (1988), Vol. 1, pp. 3–26. One such example is organo-metallic molybdenum.

Rust inhibitors selected from the group consisting of nonionic polyoxyalkylene polyols and esters thereof, polyoxyalkylene phenols, and anionic alkyl sulfonic acids may be used.

Copper and lead bearing corrosion inhibitors may be used, but are typically not required with the formulation of the present invention. Typically such compounds are the thiadiazole polysulfides containing from 5 to 50 carbon atoms, their derivatives and polymers thereof. Derivatives of 1,3,4 thiadiazoles such as those described in U.S. Pat. Nos. 2,719,125; 2,719,126; and 3,087,932; are typical. Other similar materials are described in U.S. Pat. Nos. 3,821,236; 3,904,537; 4,097,387; 4,107,059; 4,136,043; 4,188,299; and 4,193,882. Other additives are the thio and polythio sulfenamides of thiadiazoles such as those described in UK. Patent Specification No. 1,560,830. Benzotriazoles derivatives also fall within this class of additives. When these compounds are included in the lubricating composition, they are preferably present in an amount not exceeding 0.2 wt % active ingredient.

A small amount of a demulsifying component may be used. A preferred demulsifying component is described in EP 330,522. It is obtained by reacting an alkylene oxide with an adduct obtained by reacting a bis-epoxide with a polyhydric alcohol. The demulsifier should be used at a level not exceeding 0.1 mass % active ingredient. A treat rate of 0.001 to 0.05 mass % active ingredient is convenient.

Pour point depressants, otherwise known as lube oil flow improvers, lower the minimum temperature at which the fluid will flow or can be poured. Such additives are well known. Typical of those additives which improve the low temperature fluidity of the fluid are $C_8$ to $C_{18}$ dialkyl fumarate/vinyl acetate copolymers, polyalkylmethacrylates and the like.

Foam control can be provided by many compounds including an antifoamant of the polysiloxane type, for example, silicone oil or polydimethyl siloxane.

Some of the above-mentioned additives can provide a multiplicity of effects; thus for example, a single additive may act as a dispersant-oxidation inhibitor. This approach is well known and does not require further elaboration.

Catapult Oils

Catapults are instruments used on aircraft carriers at sea to eject the aircraft off of the carrier. The inventive viscosity modifier composition can be used as part of an additive package in the formulation of catapult oils together with selected lubricant additives. The preferred catapult oil is typically formulated using the viscosity modifier composition formed according to the present invention together with other conventional catapult oil additives. The additives listed below are typically used in such amounts so as to provide their normal attendant functions. The additive package may further include, but is not limited to corrosion inhibitors, oxidation inhibitors, extreme pressure agents, color stabilizers, detergents and rust inhibitors, antifoaming agents, anti-wear agents, and friction modifiers. These additives are disclosed in Klamann, "Lubricants and Related Products", *Verlag Chemie*, Deerfield Beach, Fla., 1984, which is corporated herein by reference.

The catapult oil according to the present invention can employ typically bout 90 to 99% base stock, with the remainder comprising an additive package.

Hydraulic Fluids

The inventive viscosity modifier can be used in an additive package for the formulation of hydraulic fluids together with other selected lubricant additives. The preferred hydraulic fluids are typically formulated using the viscosity modifier composition formed according to the present invention together with other conventional hydraulic fluid additives. The additives listed below are typically used in such amounts so as to provide their normal attendant functions. These other additives may further include, but are not limited to, corrosion inhibitors, boundary lubrication agents, demulsifiers, pour point depressants, and antifoaming agents.

The hydraulic fluid according to the present invention can employ typically about 90 to 99% base stock, with the remainder comprising an additive package.

Other additives are disclosed in U.S. Pat. No. 4,783,274 (Jokinen et al.), which issued on Nov. 8, 1988, and which is incorporated herein by reference.

Drilling Fluids

The inventive viscosity modifier can be used in an additive package in the formulation of drilling fluids together with other selected lubricant additives. The preferred drilling fluids are typically formulated using the viscosity modifier composition formed according to the present invention together with other conventional drilling fluid additives. The additives listed below are typically used in such amounts so as to provide their normal attendant functions. The additive package may further include, but is not limited to, corrosion inhibitors, wetting agents, water loss improving agents, bactericides, and drill bit lubricants.

The drilling fluid according to the present invention can employ typically about 60 to 90% base stock and about 5 to 25% solvent, with the remainder comprising an additive package. See U.S. Pat. No. 4,382,002 (Walker et al), which issued on May 3, 1983, and which is incorporated herein by reference.

Suitable hydrocarbon solvents include: mineral oils, particularly those paraffin base oils of good oxidation stability with a boiling range of from 200–400° C. such as Mentor 28®, sold by Exxon Chemical Americas, Houston, Tex.; diesel and gas oils; and heavy aromatic naphtha.

Turbine Oils

The viscosity modifier of the present invention can be used in an additive package in the formulation of turbine oils together with other selected lubricant additives. The preferred turbine oil is typically formulated using the viscosity modifier formed according to the present invention together with other conventional turbine oil additives. The additives listed below are typically used in such amounts so as to provide their normal attendant functions. The additive package may further include, but is not limited to, corrosion inhibitors, oxidation inhibitors, thickeners, dispersants, anti-emulsifying agents, color stabilizers, detergents and rust inhibitors, and pour point depressants.

The turbine oil according to the present invention can employ typically about 65 to 75% base stock and about 5 to 30% solvent, with the remainder comprising an additive package, typically in the range between about 0.01 to about 5.0 weight percent each, based on the total weight of the composition.

Compressor Oils

The viscosity modifier of the present invention can be used in an additive package in the formulation of compressor oils together with other lubricant additives. The preferred compressor oil is typically formulated using the viscosity modifier formed according to the present invention together with other conventional compressor oil additives. The additives listed below are typically used in such amounts so as to provide their normal attendant functions. The additive package may further include, but is not limited to, oxidation inhibitors, additive solubilizers, rust inhibitors/metal passivators, demulsifying agents, and anti-wear agents.

Polymerization

The process in accordance with the present invention forms copolymers by polymerization of a reaction mixture comprising a catalyst, ethylene and at least one additional α-olefin monomer. Polymerization in the presence of an inert diluent is preferred. Suitable diluents are described in U.S. Pat. No. 4,882,406, the teachings of which are incorporated herein by reference.

The copolymerization is carried out in a mix-free reactor system, which is one in which substantially no mixing occurs between portions of the reaction mixture that contain polymer chains initiated at different times. Suitable reactors are disclosed in U.S. Pat. Nos. 4,959,436 and 4,882,406, both of which are incorporated herein by reference. The use of a tubular reactor is preferred. Additional reaction considerations are also disclosed in these references.

To obtain the desired B block in the polymer it is necessary to add additional reactants (monomer of the at least one α-olefin) either at some point or points along the length of the tubular reactor, or at different times during the course of polymerization in a batch reactor, or at various points in a train of continuous flow stirred reactors, which can be used to mimic a tubular reactor. However, it is preferable to add essentially all of the catalyst at the inlet of a tubular reactor or at the onset of batch reactor operation. Since the tubular reactor is the preferred system for carrying out the processes in accordance with the preferred embodiment, the illustrative descriptions and examples that follow are drawn to that system, but will readily apply to other reactor systems. As will be further readily apparent to one of ordinary skill in the art having benefit of the present disclosure, more than one reactor could be used, either in parallel or in series, with multiple monomer feeds to vary intramolecular composition.

Any known diluent for the reaction mixture that is effective for the purpose can be used in conducting the polymerization in accordance with the present invention. For example, suitable diluents would be hydrocarbons such as aliphatic, cycloaliphatic and aromatic hydrocarbons, or halogenated versions of such hydrocarbons. The preferred diluents are $C_{12}$ or lower, straight or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight or branched chain, saturated hydrocarbons, particularly hexane. Non-limiting illustrative examples of diluents are hexane, methyl pentane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. Under pressurized conditions, butane and pentane are also suitable diluents.

The polyethene A block is insoluble in hydrocarbons at temperatures below about 60° C. and thus is insoluble at normal polymerization temperatures. This can be determined experimentally by observing the polymerization in a glass reactor. The reactor contents become opaque to visible light as the A block is polymerized and crystalizes from solution and the colloidally sized particles cause scattering. After the hydrocarbon-soluble B block begins to grow, the A block is partially solublized and a dispersion forms that can be stable for days at 20° C. If the concentration of the A block in the polymerizing medium is too high for the temperature at which the polymerization is run, severe precipitation can occur wherein mass transfer problems arise which tend to broaden the molecular weight distribution of the product and lower the yield of the polymer per amount of polymerization catalyst used. Concentration and temperature must be optimized to maximize production rate and minimize the breadth of the molecular weight distribution, which leads to good TE-SSI behavior.

Catalyst systems to be used in carrying out the processes in accordance with the present invention may be Ziegler catalysts, which may typically include: (a) a compound of a transition metal, i.e., a metal of Groups I-B, III-B, IVB, VB, VIB, VIIB and VIII of the Periodic Table, and (b) an organometal compound of a metal of Groups I-A, II-A, II-B and III-A of the Periodic Table.

The preferred catalyst system in practicing processes in accordance with the present invention are described, for example, in U.S. Pat. Nos. 4,882,406 and 4,900,461, the contents of which are incorporated herein by reference. This preferred catalyst system comprises hydrocarbon soluble vanadium compounds in which the vanadium valence is 3 to 5 and organo-aluminum compounds. At least one of the vanadium compounds or organo-aluminum compounds must also contain a valence-bonded halogen. Vanadium compounds useful in the practicing processes in accordance with the present invention include:

  (1)

$VCl_x(COOR)_{3-x}$  (2)

where x=0 to 3 and R=a hydrocarbon radical;

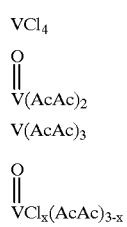  (3)

where AcAc=acetyl acetone; and where x=1 or 2; and

wherein n=2 to 3 and B=a Lewis base capable of making hydrocarbon soluble complexes with $VCl_3$ such as tetrahydrofuran, 2-methyl-tetrahydrofuran and dimethyl pyridine. In Formulas (1) and (2) above, R preferably represents $C_1$ to $C_{10}$ aliphatic, alicyclic, or aromatic hydrocarbon radical such as ethyl (Et), phenyl, isopropyl, butyl, propyl, n-butyl, i-butyl, t-butyl, hexyl, cyclohexyl, octyl, naphthyl, etc. Non-limiting illustrative examples of formulas (1) and (2) compounds are vanadyl trihalides, alkoxy halides and alkoxides such as $VOCl_3$, $VOCl_2(OBu)$ where Bu=butyl, $VO(OC_2H_5)_3$, and vanadium dichloro hexanoate. The most preferred vanadium compounds are $VCl_4$, $VOCl_3$ and $VOCl_2(OR)$.

As already noted, the co-catalyst is preferably an organoaluminum compound. In terms of chemical formulas, these compounds could be $AlR_3$, $AlR_2X$, $AlR'RX$, $Al_2R_3X_3$, $AlRX_2$, $Al(OR')R_2$, $R_2Al$-$O$-$AlR_2$ and methyl alumoxane, wherein R and R' represent hydrocarbon radicals, R and R' being the same or different, and wherein X is a halogen selected from the group consisting of bromine, chlorine, and iodine, with chlorine being preferred. The most preferred organoaluminum compound for use with a vanadium compound is an aluminum alkyl sesquichloride such as $Al_2Et_3Cl_3$ or $Al_2(iBu)_3Cl_3$. The catalyst and its effects on the polymerization are disclosed in U.S. Pat. No. 4,882,406, the subject matter of which was previously incorporated herein by reference.

Chain transfer reactions during tubular reactor polymerization can broaden molecular weight distribution and cause the formation of undesirable species such as A-only polymer or B-only polymer rather than the desired AB block copolymers of the present invention. It is desirable to operate at low temperatures, and in the absence of hydrogen to avoid hydrogen, monomer, or aluminum alkyl transfer reactions. U.S. Pat. No. 4,882,406, previously incorporated by reference, discloses chain transfer reactions. Molecular weight distribution and percent of block copolymer in the final product are also affected by catalyst deactivation during the course of polymerization which leads to termination of growing chains. Early chain termination will reduce the yield of the desired block copolymers. Deactivation can be reduced by using the shortest residence time and the lowest temperature in the reactor that will produce the desired monomer conversions.

Gel Permeation Chromatography (GPC) and several analytical techniques are used to characterize the polymer and its performance. These techniques have been described in several publications, notably U.S. Pat. No. 4,989,436, which is incorporated herein by reference. Molecular weight and composition measurements are described in G. Ver Strate, C. Cozewith, S. Ju, *Macromolecules*, 21, 3360 (1988). The variety of other techniques used are soundly based in polymer structure characterization as described in "Structure Characterization" *The Science and Technology of Elastomers*, F. Eirich, editor, Academic Press, Revised Edition 1995, Chapter 3 by G. Ver Strate. Differential Scanning Calorimetry (DSC) is used to characterize the block copolymers described herein. The standard protocol for these analysis is to load the calorimeter at 20° C. with a specimen free of molding strains and which has been stored at 20° C. for more than 48 hours, to cool the sample to −100° C., scan to 180° C. at 10° C./min., cool to −100° C., and immediately re-run the scan. $T_g$, $T_m$ and heat of fusion are evaluated for both scans. In general, only crystallinity from the polyethene A block is present in the second scan. Heats of fusion for both the A and B blocks can be evaluated by integrating the endotherms with appropriate extrapolation to construct baselines using methods known to those skilled in the art. The term "melting point", as used herein, refers to the temperature of maximum departure of the melting endotherm from the extrapolated baseline. Termination of melting may occur at a temperature 20° C. higher.

Polymerization in accordance with the preferred embodiments should be conducted in such a manner and under conditions sufficient to initiate propagation of essentially all polymer chains simultaneously. This can be accomplished by utilizing the process steps and conditions described in U.S. Pat. No. 4,959,436, incorporated herein by reference. The temperature of the reaction mixture should also be kept within certain limits. The temperature at the reactor inlet should be high enough to provide complete, rapid chain initiation at the start of the polymerization reaction. The length of time the reaction mixture spends at high temperature must be short enough to minimize the amount of undesirable chain transfer and catalyst deactivation reactions. Control of the reaction temperature in light of the fact that the reaction is exothermic, is disclosed in U.S. Pat. No. 4,959,436, which was previously incorporated herein by reference. Residence time in the reactor can vary over a wide range. The minimum could be as low as 0.5 seconds. A preferred minimum is about 2 seconds. The maximum can be as high as about 100 seconds. A preferred maximum is about 20 seconds. The residence time is dictated by the inherent reaction rates for the catalyst components that are used.

When a tubular reactor is used, the rate of flow of the reaction mixture through the reactor should be high enough to provide good mixing of the reactants in the radial direction and minimize mixing in the axial direction. Good radial mixing promotes homogeneous temperature and polymerization rates at all points in the reactor cross-section. Radial temperature gradients may tend to broaden the molecular weight distribution of the copolymer since the polymerization rate is faster in the high temperature regions. This problem can be overcome to some extent through the use of radial mixing devices such as static mixers (e.g., those produced by the Kenics Corporation).

Prior to the present invention, it has not been possible to efficiently form a high melting polyethylene (PE) A block, insoluble in the polymerization diluent, and subsequently attach an ethylene-propylene (EP) B block. Various attempts have been made to form such polymers by first polymerizing a soluble polypropylene or ethylene-propylene B block, and then attaching a polyethylene A block. Such a process can only be practiced, however, when the catalyst is capable of consuming essentially all of the propene present in the reactor prior to the introduction of the ethene. Otherwise, the PE block will contain too much propene. Such polymerizations can only be conducted at extremely low temperatures, e.g. −60° C., as described, for example by Doi et al. in "Advances in Polymer Science", 73, 201 (1996), which renders the process unsuitable for commercial production purposes, or by using metallocene catalysts that are prohibitively expensive for growing one molecule per metal atom, as described in WO9112-285A to Turner et al, both of which are incorporated herein by reference.

The amount of EP fragments, without an attached PE block will generally be reduced as the reactor temperature is lowered because the EP is formed primarily by transfer reactions, which occur above 40° C., depending upon the particular catalyst used. Conversely, the amount of PE fragments without an attached EP block is reduced as the temperature is raised. Although applicants do not wish to be bound by any particular theory, the decrease in free PE segments is thought to be due to increased A block solubility at higher temperature, which causes crystallization to slow and polymerization to be less impeded by mass transfer limitations. Thus, there will be an optimal temperature range over which the yield of the desired PE-EP block copolymer is maximized.

The product can be extracted with a suitable solvent at about 45–60° C. to determine the portion that contains no PE block. Once extracted, the polymer will still contain a fraction of low molecular weight PE unattached to EP. This fraction can be determined by performing a GPC expeiment with infrared (IR) compositional analysis of the effluent, as will be descibed in Example 4, infra. This fraction will tend to decrease as a percentage of the polymer as the monomer to diluent ratio is decreased in the reactor feed, whereby the PE concentration is decreased. This fraction will increase as the temperature of the diluent is decreased below about 10° C., at the start of polymerization. Thus, high temperatures favor lower free PE fragments and lower temperatures favor lower free EP fragments.

The preferred mode of cooling the reactor, in the process of the invention, is to use prechilled feeds and allow the reactor to operate adiabatically. Using this cooling mode, the temperature profile along the length of the reactor depends strongly on the polymerization rate, polymer concentration, and the location of the sidestream monomer feeds. Since reactor temperature depends on polymer concentration, the cement concentration (the concentration of polymer in the polymerization solvent or diluent) needs to be maintained at a level sufficiently low to cause the reactor to be operable in the optimum temperature range. For a 10° C. mainstream feed temperature, the preferred final block copolymer concentration should be between 2 and 7 wt %, preferably between 3 and 6 wt % and most preferably between 3.5 and 5 wt %. Sidestream feeds can be added at lower temperatures, e.g. −40° C., which beneficially maintains the reactor outlet temperature below about 50° C.

Product yield is also dependent on the residence time at which side feeds are injected into the reactor. If the first side stream used to initiate growth of the EP block is injected too soon, the PE block will not attain its full growth and will be shorter than desired. However, because the catalyst system used in the process of the invention loses activity rapidly, in the case in which the first side stream is injected too late, the amount of free PE fragments in the polymer increases to unacceptable levels. The time at which additional side streams are added is also important since the reactor temperature is highest at the end of the reactor, and the addition of sidestreams close to the reactor exit therefore promotes the formation of EP fragments through chain transfer reactions.

Preferred residence times will depend on catalyst components, polymer concentration and reactor temperature, and changes in reactor conditions that increase the polymerization rate will shorten the reactor residence times needed for any given result. For example, experimentation determined that to make a PE-EP block copolymer with 20 wt. % PE block at a reactor outlet temperature of about 30° C., the preferred residence time in the reactor was about 8 secs. at 1% polymer concentration, about 5 secs. at 3% polymer concentration, and about 2.5 secs. at 5% polymer concentration.

Because of the wide range of possible reaction conditions in terms of residence times, feed temperatures, reactor temperatures, and monomer concentrations, and because of complex interactions among these parameters in terms of their effect on the polymer, it is not possible to specify a most preferred mode of reactor operation that will apply to all possible catalyst components, polymer compositions, block structures and polymer molecular weights within the scope of the invention. However, for adiabatic operation of a tubular reactor, in the practice of the present invention, the following procedures are preferably observed:

(a) the first side stream is preferably added to the reactor as soon as the ethylene conversion in the main feed reaches about 85–90%;

(b) the reaction should preferably be ended by injecting a quench (short stop) into the reactor at the point at which the reactor outlet temperature has reached 75–98% of the maximum outlet temperature, defined as the temperature at a residence time at which the catalyst is 95–100% deactivated and polymerization has essentially ceased;

(c) the final side stream should preferably be added to the reactor at a residence time that is about 25–60% of the total residence time, and as dictated by the percent of catalyst remaining active (at least 60% of the catalyst should be active);

(d) the main feed temperature should preferably exceed −5° C.; and (e) the maximum outlet temperature should preferably be less than 50° C.

The reactor residence times corresponding to the first feed injection point and the quench injection point depend on the details of the reactor conditions. However, these times can be determined experimentally by observing the temperatures in the reactor, as a function of reactor length. As an example, for reactor operation at commercially attractive conditions of 4–7% polymer concentration, and with $VCl_4$ ethyl aluminum sesquichloride as catalyst, the residence time at which the first feed is injected is preferably in the range of 0.15 to 0.45 seconds, and the total residence time is preferably in the range of 1–30 seconds, most preferably 2–10 seconds.

The amount of propene monomer, and the ratio thereof to to the amount of ethene, in the main feed, affects the solubility of the A block during polymerization. Too little propene, in the main feed, results in a highly crystalline and insoluble A block and increases the propensity of the A block to precipitate from solution. In addition, a greater amount of propene in the main feed provides a resulting polymer that is more easily dissolved in oil. An excess of propene, in the main feed, lowers the the melting point of the A block causing the A block to have insufficient crystallinity during recovery of the polymer from the polymerization diluent. This causes the polymer to agglomerate and plug the flash drums and slurry strippers.

In general, for polymer made with the aforementioned vanadium catalysts, the melting point ($T_m$) of a pure (no comonomer) PE block, with no B block attached, is about 133° C. When the B block is attached, the $T_m$ is lowered about 6 to 8° C. Further lowering of the $T_m$ occurs as the propene content of the A block is increased, in an amount corresponding to the formula:

$$T_m = 126.7 \pm 1.4 - 1.84 \pm 0.36 \times (\text{weight \% propene in A block});$$

for A-B block polymers. This equation defines the lower dashed line in FIG. 1 of this application, in which the intercept on the temperature axis is 126.7±1.4° C., and the slope is 1.84±36° C. per wt. % propene.

A blocks with melting points in the range of 110–120° C., which corresponds to a 3 to 6% propene content, are preferred. In general, the instantaneous composition of the A block being polymerized varies between the reactor inlet and the position of the first side stream where the B block begins to grow. Ethene reacts faster than propene. Therefore, the A block becomes more propene rich as the instantaneous ratio of propene to ethene increases along the length of the tubular reactor and the highest melting portion of the A block forms first. If a more uniform composition is desired, an additional ethene feed can be added as a sidestream to adjust the A block composition. However, an increase in propene content toward the end of the A block increases the solubility of the block, and better facilitates the addition of the B block.

For the mix-free reactor to operate properly, the vanadium and aluminum alkylhalide catalyst should be premixed as described in U.S. Pat. No. 4,959,436, incorporated herein by reference. The premixing time and temperature can be fixed independent of the main feed. It has been found that, with catalyst concentrations in the range of 0.002 to 0.02 lbs $VCl_4$/lb. hexane at 15 to 23° C., an Al/V ratio of 8, and a premix time of 6 to 8 seconds, is near optimal for maximizing instantaneous initiation and minimizing over-reduction of the $VCl_4$ with resultant loss of catalyst activity.

During polymerization, the premixing process is optimized by observing the adiabatic temperature rise in the first few tenths of a second downstream of the catalyst-main feed mixing point. The fastest rise in temperature is preferable for a given total catalyst feed. The molecular weight distribution (MWD) of the product polymer should also be monitored. With all other variables being equal, the narrowest MWD will be obtained with the fastest rise in temperature. Catalyst component and solvent purity can affect optimum conditions, and should therefore be continuously monitored. Under-premixing causes A blocks of insufficient length and free B blocks because the chains initiate too far down the reactor. Over-premixing reduces product yield per weight of catalyst used.

The propene/ethene weight concentration ratio in the sidestream feed is determined by the desired B block composition. Higher B block ethene content requires a lower ratio. It is preferred to have as high a B block ethene content as possible in order to obtain the optimal TE-SSI performance. In general, too low a propene/ethene ratio leads to the formation of polymer fouling on the surface of the reactor surrounding the sidestream feed inlets. Too low a ratio results in unacceptable fouling rates. A ratio of above 5 leads to an insufficient ethene content in the B block and may also promote chain transfer reactions leading to formation of free B blocks. Generally, the first sidestream feed contains a higher propene/ethene ratio in comparison to subsequent feeds. This higher ratio is maintained in order to cause a sharp drop in the instantaneous composition of the polymer being made, from the high ethene content of the A block, to promote polymer solubility. This is most important when ethene conversion in the PE block polymerization is at the low end of the disclosed range of 75 to 98%.

The number of sidestreams is determined by the intra-molecular composition, and propene monomer conversion (consumption) that is desired. Because ethene polymerizes faster than propene, it is possible to obtain in excess of 95% ethene conversion where propene conversion is only 15%. If all the sidestream monomers were to be added as a single feed, the ethene would polymerize with itself, to the exclusion of propene. Ethene-ended chains incorporate propene much more effectively than propene-ended chains. Thus, propene is best incorporated when the ethene is added in several sidestreams.

In general, the sidestream feed temperature is maintained as low as possible consistent with polymer solubility and the available refrigeration capacity. Low sidestream feed temperatures help keep the reactor outlet temperature below the desired 50° C. upper limit. High reactor temperatures favor transfer reactions and catalyst termination reactions. These, in turn, produce free B blocks and A blocks attached to B blocks of insufficient length. These species are undesireable for the reasons stated above. Specifically, free A blocks are insoluble in oil, free B blocks contribute to poor low temperature properties and both broaden the MWD and reduce TE-SSI performance.

When proper reaction conditions are not maintained, the resulting block polymers contain significant amounts of free A and/or B block. The amount of these "impurities" can be determined by extraction with cyclohexane at 45–60° C., to remove free B block, and by subsequent analysis using standard GPC-FTIR to detect free A block. In the block polymers of the present invention, the amount of free B block is preferably below 15% of the total weight of the polymer, and the amount of free A block is preferably below 10% of the total weight of the polymer. Free A blocks produce sediment and haze in the oil. Free B blocks lower the TE for a given SSI and can contribute to poor low temperature properties because the absence of an A block allows the molecule, when in solution, to interact with waxes in the oil, at low temperatures.

Polymer Recovery

Following polymerization, the novel block copolymers of the present invention can be recovered from the diluent by any of the methods well known to those of ordinary skill in the art. A typical finishing process for ethene-propylene elastomeric copolymers is to first remove catalyst residues from the solution by extraction with water followed by separation of the water phase containing the catalyst residues. The polymer and diluent is then heated to flash off most of the diluent and unreacted monomers, and finally, the copolymer is recovered by either dewatering or devolatizing extrusion, depending upon the type of flashing process employed. Steam stripping is commonly used to flash off the diluent and monomers. In this process, the polymer and diluent is injected into an agitated drum of hot water maintained at a temperature above the boiling point of the diluent, and the copolymer precipitates into the water to form a slurry of wet particles, typically measuring 0.125 to 1.0 inches in size.

Because of the high temperature in the stripper drums, the elastomeric copolymer particles tend to agglomerate and foul the drum, especially when the molecular weight is low. It is particularly difficult to form a non-agglomerating slurry when the Mooney viscosity (measured at (1+4) and 125° C.) is less than about 15. This constraint places a lower limit on the molecular weight of the preferred copolymer products that can be produced in an ethylene-propylene elastomer manufacturing plant.

It is highly desireable to produce polymers with a Mooney viscosity of less than 15 in order to obtain low SSI values. It was thought that such polymers would be very difficult, or impractical, to recover by steam stripping. Surprisingly, however, it was found that the presence of the PE block in the polymer imparts residual crystallinity to the polymer even at steam stripping temperatures. Consequently, the polymers behave in the steam stripper as if they had a much higher viscosity than a melted polymer of the same molecular weight, and it is possible to slurry polymers with Mooney viscosities as low as 5 as measured at 150° C. (which corresponds to a Mooney viscosity of about 8 at 125° C.), at steam stripping temperatures, even above 110° C. For low Mooney viscosity block copolymer products, the maximum steam stripping temperature that can be used without particle precipitation problems is related to the melting point of the PE block, which is a function of propylene content, as was described above. In general, the maximum stripping temperature should be 3 to 8° C. less than the $T_m$ of the PE block.

EXAMPLES

In the following examples it is demonstrated that there are clear bounds on the PE block content and Tm, fixed on the low end by polymer recovery operations in manufacturing and on the high end by solubility of the mechanically degraded polymer in oil at 100 C. The kv of the fully dissolved polymer must be measured at 100 C. to classify the oil by grade and to test it's susceptibility to mechanochemical degradation.

There are also bounds on the process conditions to make the polymer. Those conditions which may be used to prepare prior art narrow MWD mix free reactor polymers must be altered due to the insolubility of the PE block in the polymerization diluent. Temperature and cement concentration must be controlled to minimize the amount of free A and B block that is formed.

Comparative Example 1a

Samples of poly-co(ethene-propene) (EP) polymers of two different molecular weights are prepared as described in Example 4 of U.S. Pat. No. 4,900,461. The manufacture includes catalyst premixing, polymerization in hexane diluent, deashing of the polymer with a water wash, recovery of the polymer from the diluent by steam distillation and extrusion drying to remove residual water, hexane and other volatiles. These polymers can be purchased from Exxon Chemical Co. as Vistalon 878 and Vistalon 91-9.

The polymers were formulated to produce 0.7 and 1.1 weight percent solutions in a basestock, ENJ 102, which basestock has a 100 C kv of 6.05 cStokes.

These solutions were tested for polymer mechanochemical stability by subjecting them to a Kurt Orbahn shear stability index (SSI) test. Results are presented in Table 1a.

The polymers were also formulated into 10W40 SH passenger car lubricating oil compositions. The formulation is as follows (in wt. %): VM concentrate PTN8452 11.2, Exxon 100N LP 25, Exxon 150N RP 51.7, Paranox 5002 12.1.

The pour points (PP), mini rotary viscometer (MRV) viscosities measured in the TP1 cycle, cold cranking simulator (CCS), viscosity index (VI) and high temperature high shear viscosity (HTHS), were similarly measured with the results given in Table 1a.

TABLE 1A

Properties of Commercial Mix Free Reactor Poly(ethene-co-propene) Polymers

| Sample | Mooney Viscosity Polymer | TE ENJ 102 | SSI % >>> | Mw K Polymer | Tm C >>> | Wt % Ethene >>> | PP C Final Oil >> | TP1 cP -20° C. >>> | CCS cP -20° C. >>> | HTHS cP 150° C. >>> | VI >>> |
|---|---|---|---|---|---|---|---|---|---|---|---|
| 878 | 55 | 3.3 | 50 | 180 | 45 | 54 | -30 | 8,900 | 2960 | 3.7 | 140 |
| 91-9 | 20 | 2.8 | 37 | 140 | 45 | 53 | -30 | 8,970 | 2930 | 3.8 | 140 |

The performance of these EP polymers as lubricating oil viscosity modifiers with regard to TE-SSI and low temperature properties vs manufacturing cost is believed to the best for any VM available prior to the present invention.

Comparative Example 1b

EP polymers that are made in conventional backmixed reactors are less effective compared to those of Example 1. They do not have as good a TE-SSI behavior for their molecular weight and average ethene content and the low temperature properties are not as good.

PARATONE 8900 and PAPATONE 715, are products of Exxon Chemical, are commercially available and are made in such backmixed reactors. The former has a higher ethene content and outperfoms the latter as a viscosity modifier in TE-SSI, but is inferior with respect to pour point.

Another commercially available family of polymers are the Shellvis 200–300 grades. These are hydrogenated star branched polyisoprenes.

Data for comparative purposes for these polymers is presented in Table 1b. The formulations are as follows;

For 15W40

SV251(13.5% AI) 5.41 wt. %, Mobil 100NS 59.4 wt %, Mobil 300NS 17.9 wt. %, ESN 130 1.4 wt. %, PARAFLOW 387 0.22 wt. %, PARANOX 3381 15.6 wt. %. With PARATONE 8900, same as above, except PARATONE 8900 0.67 wt. % (pure polymer), ESN 130 6.1 wt. %, PARAFLOW 387 0.43 wt. %

For 20W50

SV251(13.5% AI) 5.41 wt. %, Mobil 150NS 5.0 wt %, Mobil 300NS 72.6 wt. %, ESN 130 1.2 wt. %, PARAFLOW 387 0.22 wt. %, PARANOX 3381 15.6 wt. %. With PARATONE 8900, same as above, except PARATONE 8900 0.64 wt. % (pure polymer), ESN 130 5.84 wt. %, PARAFLOW 387 0.43 wt. %

For 10W30

SV251(13.5% AI) 5.04 wt. %, Mobil 100NS 44.9 wt %, Mobil 300NS 32.8 wt. %, ESN 130 1.5 wt. %, PARAFLOW 387 0.22 wt. %, PARANOX 3381 15.6 wt. %. With PARATONE 8900, same as above, except PARATONE 8900 0.64 wt. % (pure polymer), ESN 130 5.8 wt. %, PARAFLOW 387 0.43 wt. %

All components are commercially available products of either Mobil or Exxon Corporations.

TABLE 1B

PERFORMANCE OF PTN 8900 AND SV 251

Fixed BS Ratios: Mobil 150NS:Mobil300NS:ESN130 = 71.2:21.5:7.3

| VM | 15W40 LOFI/Treat (wt %) | SSI | TE (ENJ102) | Net VM Treat Rate (wt %) | kv @ 100 C | CCS (-15 C) | PP (C) | Typical Te TP1 (-20 C) | Yield Stress | Haze |
|---|---|---|---|---|---|---|---|---|---|---|
| SV251** | PF387/0.22 | 8 | 2.4 | 0.73 | 14.19 | 3280 | -27 | 10460 | <35 | 11 |
|  | PF392/0.15 |  |  |  |  |  | -27 | 11000 | <35 |  |
| PTN8900 | PF387/0.43 | 24 | 2 | 0.67 | 14.88 | 3155 | -24 | 8610 | <35 | 11 |
|  | PF392/0.3 |  |  |  |  |  | -30 | 8190 | <35 |  |

Mobil 100 NS:Mobil 150 NS:ESN130 = 53.7:39.3

| 10W30 VM | LOFI/Treat (wt %) | SSI | TE (ENJ102) | Net VM Treat Rate (wt %) | kv @ 100 C | CCS (-15 C) | PP (C) | TP1 (-20 C) | Yield Stress | Haze |
|---|---|---|---|---|---|---|---|---|---|---|
| SV251** | PF387/0.22 | 8 | 2.4 | 0.68 | 11.67 | 3215 | -27 | 10780 | <35 | 9 |
|  | PF392/0.15 |  |  |  |  |  | -21 | 56600 | >105 |  |
| PTN8900 | PF387/0.43 | 24 | 2 | 0.64 | 11.66 | 3300 | -27 | 10240 | <35 | 10 |
|  | PF392/0.3 |  |  |  |  |  | -33 | 10285 | <35 |  |

Mobil 150 NS:Mobil 300 NS:ESN130 = 5.97:87.03:kv @ 100 C (BS + DI) =

| 20W50 VM | LOFI/Treat (wt %) | SSI | TE (ENJ102) | Net VM Treat Rate (wt %) | kv @ 100 C | CCS (-15 C) | PP (C) | TP1 (-20 C) | Yield Stress | Haze |
|---|---|---|---|---|---|---|---|---|---|---|
| SV251** | PF387/0.22 | 8 | 2.4 | 0.73 | 18.41 | 4015 | -24 | 11750 | <35 | 10 |
|  | PF392/0.15 |  |  |  |  |  | -24 | 12370 | <35 |  |

TABLE 1B-continued

PERFORMANCE OF PTN 8900 AND SV 251

| PTN8900 | PF387/0.43 | 24 | 2 | 0.64 | 18.29 | 4039 | −24 | 10420 | <35 | 10 |
| | PF392/0.3 | | | | | | −27 | 10810 | <35 | |

In the above-table, haze is measurd using a HACH Turbidimeter (MOdel 18900-00 Ratio Turbidimeter)
*The kv of (basestocks + DI + LOFI) of the finished oil was estimated from the TE equation, assuming a TE of 2 for PTN8900.
**SV251 (concentrate form of SV250) was chosen by Isabel MacDonald for comparison purposes.
***SB: Silverson Treatment

Comparative Example 2

In this example a polymer similar to those in Comparative Example 1a is prepared, except that the middle section of the molecule is made to have an average ethene content of 60 to 63 weight % ethene. This sample can be found as Example 3–5 in U.S. Pat. No. 4,900,461. With the center section of the molecule at lower ethene content than in Example 1a above, the intramolecular CD is nearly flat. The polymer is tested in the same formulation as in Example 1a.

TABLE 2

Properties of Poor EP Structure Mix Free Reactor Poly(ethene-co-propene) Polymers

| Sample | Mooney | TE | SSI % | PP C | TP1 cP −20° C. | CCS cP −20° C. | Mw K | HTHS cP | VI | Tm C | Wt % Ethene |
|---|---|---|---|---|---|---|---|---|---|---|---|
| Sample 2A | 55 | 3.4 | 58 | −20 | >30 K | 3200 | 180 | 3.7 | 140 | <20 | 50 |

It is seen that the PP and TP1 values exceed those acceptable for SH 10W30 grade oils. The needed exclusion of sections of the polymer chain from containing 56–65 wt. % ethene restricts the manufacturer in how the product can be made and the product polymer performance is subject to wide variation dependent on the wax structure of the particular basestock employed.

Comparative Example 3

In this example a polymerization such as that used to make the 878 and 909 polymers of Comparative Example 1a above was run, with the exception that adequate catalyst was added to the reactor to lower the molecular weight (Mw) to 110K. This polymer has a TE of about 2.5 and a melting point below 50° C., and a Mooney viscosity at 125° C. of about 15.

When the polymer cement was steam distilled at 110° C. to remove the solvent after polymerization, the polymer agglomerated and plugged the steam distillation vessel. It is not possible to manufacture polymer in conventional polyco (ethene-propene) manufacturing plants using polymers with the intramolecular compositional distribution of Examples 1a, 1b above, with a low enough molecular weight or TE to have the SSI be below 30%. This experiment has been repeatedly run under commercial conditions and the minimum molecular weight that can be finished, in terms of Mooney viscosity at 125° C. is 15, where TE is about 2.7 and SSI is >35%.

The tendency for the polymer to agglomerate in a steam distillation operation can be measured by the low strain rate ($<10^{-1}$ $sec^{-1}$) bulk viscosity of the polymer at 110° C. Polymers with viscosity less than $10^6$ poise agglomerate. Various slurry aids and agitation of the vessel's contents can be employed to vary this operation boundary somewhat, however it is a practical limitation on a steam distillation operation where soft buoyant particles must be prevented from agglomerating and clogging the processing equipment.

Example 4

In this example a series of PE-EP block polymers of differing molecular weight, % PE block, EP composition and MWD were made and then tested in subsequent examples for the properties measured in the Comparative Examples above.

Experiments were carried out in a tubular reactor of either 1" or 5" diameter. A main feed consisting of hexane, ethylene and optionally propylene, was prechilled and fed to the reactor inlet. The catalyst components were premixed as described in U.S. Pat. No. 4,804,794 and fed to the reactor downstream of the main feed inlet, to initiate polymerization. Additional feeds of hexane, ethylene, and propylene were added along the reactor length through mixing tees to form the EP block of the block polymer. Hexane was present in the side stream flows in a sufficient amount to dissolve all the monomers. Reactor outlet pressure was set high enough to prevent the formation of a vapor phase in the reactor. Main feed and side stream feed temperatures could be controlled independently and were adjusted to give the desired reactor outlet temperature.

The material exiting the reactor was a polymer dispersion in hexane that had the appearance of a glass of milk. After many hours of settling, the dispersion separated into a clear hexane phase containing some dissolved EP block and a concentrated disperse phase of approximately equal volume. Thus, the products of this invention do not form a solution in hexane at the conditions in the reactor.

At a selected point along the reactor, a stream of water was injected to kill the catalyst and end the polymerization. Catalyst residues were removed from the polymer solution by water extraction. Polymer was then recovered from solution by steam precipitation (distillation of the solvent and residual monomers) followed by extrusion drying of the wet rubber.

When the reactor and polymer recovery system were at steady state for a given set of reactor operating conditions, polymer samples were obtained either from the reactor outlet, the steam stripping tank, or the extruder outlet, for analysis. Polymer analysis were carried out by the following techniques:

a. Average Ethylene Content

The same infrared technique as that disclosed in U.S. Pat. No. 4,900,461 was employed to measure the ethene content of the whole polymers. The ASTM methods described there, ASTM D3900-95 (and it's precursors) and ASTM D2238, have been modified by recalibration based on a set of standards analyzed for ethylene content by C13 NMR. For reference to the previous work new and old ethene contents are related as follows: new wt % ethene=0.66 (old wt % ethene)+26.9 (high ethene method) and new Wt % ethene= 1.07 (old wt % ethene)+2.2 (low ethene method). Thus there is an upward shift of about 5.7 wt % ethene at 50% ethene.

b. Mooney Viscosity (ML 1+4): ASTM D 1646-96

The Mooney viscosity was measure according to ASTM D 1646-96 except that the temperature was 150° C. instead of the standard 125° C., as the polymer is still crystalline at 125° C. and the viscosity is raised by the crystallinity yielding results which do not correlate with molecular weight, TE or SSI.

c. Gel Permeation Chromatography/LALLS (GPC/LALLS)

Molecular weight and molecular weight distribution were measured by the same techniques as disclosed in U.S. Pat. No. 4,900,461. Further disclosure of that method was presented in G. Ver Strate, C. Cozewith, S. Ju, Macromolecules, 1988, 21 3360, which is incorporated herein as reference. Standard conditions are 135° C. using trichlorobenzene as solvent.

As noted in the cited reference various GPC parameters have absolute significance in addition to permitting MWD breadths to be compared on a relative basis. For purposes of this application the GPC data were evaluated using no corrections for spreading, concentration dependence on elution time or other effects. The set of four Showdex columns produced Mw/Mn of <1.03 for polystyrene standards run on the same basis. Thus, such corrections were not necessary. Similarly, the values for the derivative of the integral of the MWD with respect to log M at its maximum can be compared. A hydrogenated polybutadiene polyisoprene block polymer prepared by anionic polymerization has a value for this quantity of about 5.8. The narrowest PE-EP block polymer made to date in the mix free reactor and analyzed equivalently has a value of 2.6. The Mw/Mn is 1.12. A most probable MWD, that obtained in backmixed reactors with single site catalysts, has a theoretical and observed value of 1.5. The Mw/Mn is 2.0.

d. Gel Permeation Chromatography/FourierTransform Infra Red Spectroscopy (GPC/FTIR)

Compositional analysis across the molecular weight distribution was performed by operating a GPC instrument similar to that disclosed above with the effluent passed through a Fourier Transform Infrared photometer (FTIR) instead of the Low Angle Laser Light Scattering (LALLS) instrument. The composition of the eluting polymer was measured from characteristic methyl and methylene bands at 1377, 1154 and 1464, 730 $cm^{-1}$ respectively. Compositionally homogeneous copolymers of composition measured using the techniques described above in ASTM D 3900-95 were used to calibrate the FTIR.

e. Melting Behavior

Melting points and heats of fusion were determined by Differential Scanning Calorimetry (DSC). Strain free specimens were prepared by molding 0.030"×3"×3" pads of the polymer at 150° C. for 30 minutes with subsequent cooling to 20° C. at a rate of 30 degrees per minute. After cooling, the polymer was annealed for at least 24 hours at 20° C. One to five mg. samples of the polymer were cut from the pad and loaded into the DSC at 20° C. The sample was cooled to −100° C. at a rate of 20 degrees per minute and then scanned at 10 degrees per minute to 180° C.

The melting point was recorded at a maximum deviation from baseline on the first heat cycle. The upper limit at which all melting ceases with complete return to baseline can be as much as 15° C. higher than the temperature at maximum deviation.

Baselines were back-extrapolated from above the melting region to establish areas to be integrated for heat of fusion determination. Where baseline construction was ambiguous, shoulder to shoulder construction was also examined and an average value determined. A region from 90–130° C. could be distinguished from a lower melting portion that extended from the annealing temperature of 20° C. up to 70–80° C. The upper temperature region is PE block and the lower region is the semicrystalline EP block. In the second melting run of the DSC, the EP crystallinity is much diminished due to its slower crystallization rate compared to the PE block. This aids in distinguishing the PE blocks from the EP blocks.

Because the low temperature properties of the polymer in oil are relatively insensitive to the absolute amounts of crystallinity present, once the amount of crystallinity is above a minimum level for the PE block, the exact heats of fusion are not critical. It is the range over which the properties are good that is important.

f. % PE block

The heat of fusion of polymer melting between 95 and 135° C. is an indication of the amount of PE block in the polymer. Measurement of the heat of fusion of pure polyethylene made with the catalyst system of this invention by the technique described above, yields a heat of fusion that averages 190 J/g. The heat of fusion in the PE melting region divided by 190 is the fraction of PE in the block copolymer when the PE block contains no propylene. When propylene is present in the PE block, the heat of fusion is depressed and it is not possible to accurately determine the % PE block by DSC unless the amount of propylene in the block is known. In the absence of that information, the amount of PE block can be estimated by a heat balance in the PE section of the polymerization reactor when the reactor is operated adiabatically. The temperature rise in the PE section is proportional to the amount of PE produced. When the propylene content is known, the heat of fusion can be adjusted from the 190 J/g value and the % PE block calculated from the point at which the calorimetric value and heat balance are in agreement.

A polymerization was carried out in the one inch diameter reactor in which the feed rate of propylene to the reactor inlet was varied at otherwise constant conditions. A water quench was injected into the reactor at the point where the first side stream would normally be injected so that only a PE block was formed. The propylene content of the polymer was analyzed by C13 NMR. The data in table below show the relationship between polymer composition, polymer melting point, and polymer heat of fusion, all at essentially constant molecular weight and MWD.

| | | | | Polyethylene Blocks With No EP Block Attached | | | |
|---|---|---|---|---|---|---|---|
| Weight Propene/ Ethene in Feed | Wt % Propene In Polymer C13 NMR | Melting Point Tm C | Heat Of Fusion J/g | Mn × 10$^{-3}$ Elution Time | Mw × 10$^{-3}$ Elution Time | Mw × 10$^{-3}$ LALLS | Mw/Mn Elution Time |
| 0.0 | 0.0 | 132.3 | 222.8 | 16.7 | 25.4 | 23.2 | 1.5 |
| 0.1 | 3.2 | 127.9 | 187.1 | 17.5 | 24.8 | 24.5 | 1.4 |
| 0.2 | 4.3 | 124.8 | 169. | 16.5 | 22.8 | 21.6 | 1.4 |
| 0.3 | 5.5 | 120.4 | 140.8 | 17.5 | 25.9 | 22.9 | 1.5 |

These data as well as melting point vs main feed composition results from example 6 below are presented in FIG. 1. It is seen in FIG. 1 that the melting point of the PE block decreases as the propene content of the main feed is increased. The upper dashed line is drawn as a guide. A second lower dashed line passes through the melting points of an additional 8 samples which have an EP block attached to the PE block. The lines are almost parallel. It is seen that for a given propene/ethene feed ratio the PE blocks with EP attached melt at about 6° C. lower than PE blocks with no EP attached. This presumably is due to the constraints the EP block imposes on the PE packing into crystals. There is also an entropy of melting effect as the melted PE is now dissolved in a matrix which contains EP as well as PE.

It should further be noted that the polymer described in the table, which are PE blocks by definition as no sidestreams were added, have different heats of fusion depending on propene content. To calculate a % PE block, one must know the propene content to determine the correct J/g for the block.

It is very difficult to measure the propene content in the PE block once the PE block is attached to an EP block because the FTIR or C13 NMR cannot easily distinguish between methyl groups in the two parts of the molecule. Thus, the following convention is adopted to estimate the propene content of the PE blocks in the PE-EP block polymers. The measured Tm of the PE block in the PE-EP polymer is located on the lower dashed line of FIG. 1. That corresponds to a known feed ratio. It is assumed that the PE block composition is fixed by the feed ratio and the % propene can be interpolated from the known values for the PE with no EP block attached. This exercise need not be performed in the context of a plot which shows the melting points. However, the plot lends credence to the proper assumption that the same feed ratio produces the same % propene for both type polymers when the Tm vs feed ratio slope is so similar. Thus, at 0.2 feed ratio, when the free PE block melts at about 125° C. and the PE-EP block made with the same mainstream feed ratio melts at about 119° C., it is estimated that the propene content of the PE section of the two polymers is the same and equal to 4.3 weight % as shown in FIG. 1.

g. Solubility in Cyclohexane

A polymer pad was formed in a hot press and 3–5 g of roughly cubic pieces of dimensions <3 mm were cut from the pad with a scissors. These pieces were accurately weighed and placed in 250 cc of cyclohexane and allowed to stand for 3–5 days in a thermostatted oven at a chosen temperature between 45° C. and 65° C., with periodic gentle agitation. At the end of this time, the mixture was passed through a fine mesh screen that had been previously tarred to filter the insoluble polymer. The screen was put into a vacuum oven to remove all solvent, and was then weighed to determine the quantity of insoluble polymer present. The solution passing through the screen was evaporated to dryness to recover the soluble fraction.

The polymerization conditions are given in Table 4a.

TABLE 4A

Preparation Conditions for PE-EP Block Polymers

| | POLYMER ID | | | | | | | | | | | |
|---|---|---|---|---|---|---|---|---|---|---|---|---|
| Reactor Conditions (1) | NDG 5 | NDG 7 | NDG 12 | NDG 29 | NDG 30 | NDG 31 | NDG 40 | NDG 41 | NDG 42 | NDG 43 | | |
| Main Feed | | | | | | | | | | | | |
| Main feed temperature, °C. | (10) | (10) | 10 | 10 | 10 | 10 | 10 | 25 | 25 | 10 | | |
| VCl4 | 0.185 | 0.487 | 0.315 | 0.52 | 0.4 | 0.44 | 0.4 | 0.4 | 0.4 | 0.4 | | |
| EASC, 15 wt % | 7.05 | 18.8 | 11.8 | 18.2 | 14.2 | 14.9 | 14.89 | 14.89 | 14.89 | 14.89 | | |
| Hexane | 1609.0 | 1621.8 | 1627.6 | 1634 | 1629.6 | 1630.5 | 1630.6 | 1630.6 | 1631 | 1630.6 | | |
| Ethylene | 5.7 | 6.27 | 10 | 12.3 | 6.7 | 10 | 10 | 10 | 10 | 10 | | |
| Propylene | 0? | 0? | 1.49 | 4 | 2 | 2.85 | 1.2 | 1.2 | 1.2 | | | |
| Side Feeds | | | | | | | | | | | | |
| Side feed temperature, °C. | (0) | (0) | 0 | 0 | 0 | 0 | 0 | 0 | 0 | 0 | | |
| Res. time to 1st side feed, sec | 1.64 | 1.63 | 1.85 | 1.61 | 1.62 | 1.62 | 1.62 | 1.62 | 1.62 | 1.62 | | |
| Side Feed 1 | | | | | | | | | | | | |
| Hexane | 200 | 200 | 200 | 200 | 200 | 200 | 200 | 200 | 200 | 200 | | |
| Ethylene | 5.3 | 5.33 | 6.73 | 6.65 | 7.42 | 7 | 7 | 7 | 7 | 7 | | |
| Propylene | 37.7 | 22.8 | 50.3 | 42.8 | 47.7 | 40.3 | 50 | 50 | 50 | 50 | | |
| Res. time to 2nd side feed, sec | 1.94 | 1.93 | 2.16 | 1.9 | 1.91 | 1.91 | 1.91 | 1.91 | 1.91 | 1.91 | | |
| Side Feed 2 | | | | | | | | | | | | |
| Hexane | 200 | 200 | 200 | 200 | 200 | 200 | 200 | 200 | 200 | 200 | | |
| Ethylene | 5.3 | 5.33 | 6.73 | 6.65 | 7.42 | 7 | 7 | 7 | 7 | 7 | | |
| Propylene | 22.7 | 10 | 30.3 | 26.6 | 29.7 | 23.3 | 30 | 30 | 30 | 30 | | |
| Res. time to 3rd side feed, sec | 3.7 | 3.69 | 3.87 | 3.61 | 3.63 | 3.63 | 3.62 | 3.62 | 3.62 | 3.62 | | |
| Side Feed 3 | | | | | | | | | | | | |
| Hexane | 200 | 200 | 200 | 200 | 200 | 200 | 200 | 200 | 200 | 200 | | |
| Ethylene | 5.3 | 5.33 | 6.73 | 6.65 | 7.42 | 7 | 7 | 7 | 7 | 7 | | |
| Propylene | 22.7 | 10 | 30.3 | 26.6 | 29.7 | 23.3 | 30 | 30 | 30 | 30 | | |
| Res. time to 4th side feed, sec | | | | | | | | | | | | |
| Side Feed 4 | | | | | | | | | | | | |
| Hexane | | | | | | | | | | | | |
| Ethylene | | | | | | | | | | | | |
| Propylene | | | | | | | | | | | | |
| Res. time to 5th side feed, sec | | | | | | | | | | | | |
| Side Feed 5 | | | | | | | | | | | | |
| Hexane | | | | | | | | | | | | |
| Ethylene | | | | | | | | | | | | |
| Propylene | | | | | | | | | | | | |
| Res. time to 6th side feed, sec | | | | | | | | | | | | |

TABLE 4A-continued

Preparation Conditions for PE-EP Block Polymers

| Side Feed 6 | | | | | | | | | |
|---|---|---|---|---|---|---|---|---|---|
| Hexane | | 5.14 | 5.16 | 5.28 | 4.56 | 4.57 | | 4.58 | |
| Ethylene | | | | 27.4 | | 31.6 | | | |
| Propylene | | | | 41.9 | | 42.8 | | | |
| Res. time at quench, sec | | | | | | | | | |
| Reactor outlet temp., °C | | | 30 | | | | | | |
| Polymerization rate, kg/hr | | 17 | | | | | | | |
| (1) Feed rates Kg/hr, T or C 1-inch reactor | | | | | | | | | |

POLYMER ID

| | (2) 5/13/96 10:37 | 7/14/96 12:28 | 7/14/96 13:21 | 7/14/96 13:54 | 9/23/96 14:40 | 9/23/96 15:10 | 9/23/96 15:40 | 9/23/96 16:30 | 1/20/97 15:00 | 1/20/97 17:00 | 1/20/97 22:00 | 1/21/97 0:45 | 1/21/97 1:35 | 1/21/97 4:00 | 1/21/97 6:00 |
|---|---|---|---|---|---|---|---|---|---|---|---|---|---|---|---|
| Reactor Conditions (2) | | | | | | | | | | | | | | | |
| Main Feed | | | | | | | | | | | | | | | |
| Main feed temperature, °F. | 28.9 | 27 | 27 | 27 | 50 | 50 | 50 | 50 | 53.1 | 53.1 | 53.1 | 47.8 | 43 | 34.5 | 34.5 |
| VCl4 | 0.101 | 0.0772 | 0.0534 | 0.0611 | 0.0685 | 0.0685 | 0.0685 | 0.047 | 0.089 | 0.0801 | 0.0722 | 0.0722 | 0.0722 | 0.0722 | 0.0722 |
| EASC, 100% | 0.502 | 0.387 | 0.268 | 0.306 | 0.342 | 0.342 | 0.342 | 0.235 | 0.445 | 0.40 | 0.351 | 0.361 | 0.361 | 0.361 | 0.361 |
| Hexane | 64.1 | 135.5 | 147.6 | 129.1 | 129 | 129 | 144 | 115 | 173 | 173 | 173 | 173 | 173 | 173 | 173 |
| Ethylene | 2.27 | 2.11 | 2.19 | 2.15 | 2.15 | 2.15 | 2.15 | 1.15 | 2.77 | 2.77 | 2.77 | 2.77 | 2.77 | 2.77 | 2.77 |
| Propylene | 0.536 | 0.54 | 0.54 | 0.55 | 0.27 | 0 | 0 | 0 | 0.55 | 0.55 | 0.47 | 0.47 | 0.47 | 0.47 | 0.47 |
| Side Feeds | | | | | | | | | | | | | | | |
| Side feed temperature, °F. | 19.2 | 19.3 | 19.3 | 19.3 | −40.9 | −40.9 | −40.9 | −40.9 | −40 | −40 | −40 | −40 | −40 | −40 | −40 |
| Res. time to 1st side feed, sec | 0.52 | 0.52 | 0.48 | 0.55 | 0.68 | 0.68 | 0.56 | 0.79 | 0.27 | 0.27 | 0.27 | 0.27 | 0.27 | 0.27 | 0.27 |
| Side Feed 1 | | | | | | | | | | | | | | | |
| Hexane | 11 | 11.1 | 11.4 | 10.96 | 16.6 | 16.6 | 16.5 | 21 | 16.8 | 16.8 | 16.8 | 16.8 | 16.8 | 16.8 | 16.8 |
| Ethylene | 1.12 | 1.01 | 0.983 | 1.01 | 1.47 | 1.47 | 1.33 | 0.7 | 1.68 | 1.68 | 1.68 | 1.68 | 1.68 | 1.68 | 1.68 |
| Propylene | 5.12 | 4.86 | 4.83 | 4.91 | 7.15 | 7.15 | 7.15 | 3.43 | 13.5 | 13.5 | 13.5 | 13.5 | 13.5 | 13.5 | 13.5 |
| Res. time to 2nd side feed, sec | 0.65 | 1.05 | 0.97 | 0.69 | 0.68 | 0.68 | 0.56 | 0.79 | 0.42 | 0.42 | 0.42 | 0.42 | 0.42 | 0.42 | 0.42 |
| Side Feed 2 | | | | | | | | | | | | | | | |
| Hexane | 11 | 11.3 | 11.4 | 10.96 | 16.6 | 16.6 | 16.5 | 21 | 17.9 | 17.9 | 17.9 | 17.9 | 17.9 | 17.9 | 17.9 |
| Ethylene | 1.12 | 1.02 | 0.983 | 1.01 | 1.47 | 1.47 | 1.33 | 0.7 | 1.96 | 1.96 | 1.96 | 1.96 | 1.96 | 1.96 | 1.96 |
| Propylene | 5.12 | 4.92 | 4.83 | 4.91 | 7.15 | 7.15 | 7.15 | 3.43 | 6.2 | 6.2 | 6.2 | 6.2 | 6.2 | 6.2 | 6.2 |
| Res. time to 3rd side feed, sec | 0.91 | 1.29 | 1.22 | 0.94 | 1.06 | 1.06 | 1.26 | 1.69 | 0.54 | 0.54 | 0.54 | 0.54 | 0.54 | 0.54 | 0.54 |
| Side Feed 3 | | | | | | | | | | | | | | | |
| Hexane | 11.9 | 13.4 | 13.6 | 13.2 | 16.6 | 16.6 | 16.5 | 21 | 22.4 | 22.4 | 22.4 | 22.4 | 22.4 | 22.4 | 22.4 |
| Ethylene | 1.03 | 1.22 | 1.17 | 1.22 | 1.47 | 1.47 | 1.33 | 0.7 | 1.96 | 1.96 | 1.96 | 1.96 | 1.96 | 1.96 | 1.96 |
| Propylene | 4.69 | 5.86 | 5.76 | 7.15 | 7.15 | 7.15 | 3.43 | 6.2 | 6.2 | 6.2 | 6.2 | 6.2 | 6.2 | 6.2 | |
| Res. time to 4th side feed, sec | 1.04 | 1.75 | 1.67 | 1.05 | 1.71 | 1.71 | 2.18 | 2.8 | | | | | | | |

TABLE 4A-continued

Preparation Conditions for PE-EP Block Polymers

| | 374B | 350E | 318A | 318B | 366B | 380B | 420A | 368C |
|---|---|---|---|---|---|---|---|---|
| Side Feed 4 | | | | | | | | |
| Hexane | 12.7 | 13.4 | 13.6 | 13.2 | | | | |
| Ethylene | 0.479 | 1.22 | 1.17 | 1.22 | | | | |
| Propylene | 2.19 | 5.86 | 5.76 | 5.92 | | | | |
| Res. time to 5th side feed, sec | 1.15 | | | | | | | |
| Side Feed 5 | | | | | | | | |
| Hexane | 14.5 | | | | | | | |
| Ethylene | 0.479 | | | | | | | |
| Propylene | 2.19 | | | | | | | |
| Res. time to 6th side feed, sec | 1.27 | | | | | | | |
| Side Feed 6 | | | | | | | | |
| Hexane | 18.6 | | | | | | | |
| Ethylene | 0.479 | | | | | | | |
| Propylene | 2.19 | | | | | | | |
| Res. time at quench, sec | 5.34 | 7.31 | 7.15 | 7.65 | 7.43 | 7.62 | 7.62 | 7.62 |
| Reactor outlet temp., °F. | 135 | 125.3 | 121.1 | 122 | 106.8 | 104.8 | 98.97 | 98.7 |
| Polymerization rate, klb/hr | 10.5 | 11.1 | 10.8 | 10.6 | 11 | 9.96 | 9.59 | 6.3 |

(2) All feed rates in klb/hr, temperature in °F.

5-inch reactor

| POLYMER ID | 374B | 350E | 318A | 318B | 366B | 380B | 420A | 368C |
|---|---|---|---|---|---|---|---|---|
| Main Flow g/h | | | | | | | | |
| Hexane | 53064 | 53807 | 53803 | 53803 | 54358 | 43164 | 53737 | 53460 |
| Ethylene | 270 | 263 | 46 | 46 | 270 | 181 | 274 | 180 |
| Propylene | 0 | 0 | 0 | 0 | 0 | 0 | 0 | 0 |
| VCl4 | 2.5 | 3.2 | 2.4 | 2.4 | 3.5 | 2.5 | 4.5 | 2.5 |
| At/V | 6 | 8 | 8 | 8 | 8 | 6 | 7 | 8 |
| Side Stream 1/g/h | | | | | | | | |
| Hexane | 6178 | 5940 | 8910 | 8910 | 6138 | 6019 | 6178 | 6178 |
| Ethylene | 100 | 75 | 100 | 100 | 100 | 100 | 100 | 1100 |
| Propylene | 1100 | 827 | 1070 | 1070 | 1137 | 1119 | 1100 | 1148 |
| Side Stream 2, g/h | | | | | | | | |
| Hexane | 8831 | 5940 | 6415 | 6415 | 8989 | 8870 | 8910 | 8950 |
| Ethylene | 100 | 75 | 77 | 77 | 100 | 100 | 100 | 100 |
| Propylene | 400 | 319 | 258 | 258 | 425 | 435 | 438 | 423 |

TABLE 4A-continued

Preparation Conditions for PE-EP Block Polymers

| | | | | | | |
|---|---|---|---|---|---|---|
| Side Stream 3, g/hr | | | | | | |
| Hexane | 6178 | 5940 | 5940 | 6205 | 6613 | 6494 | 6455 |
| Ethylene | 0 | 48 | 48 | 0 | 0 | 0 | 0 |
| Propylene | 0 | 148 | 148 | 0 | 0 | 0 | 0 |
| ENB | 6.5 | | | 6.6 | 13.8 | 9.9 | 7.2 |
| Side Stream 4, g/hr | | | | | | |
| Hexane | | | 396 | | | | |
| ENB | | | 8 | | | | |
| Temperature, ° C. | | | | | | |
| Premix | 18.2 | 10.2 | 9.1 | 12.4 | 18.5 | 11.9 | 12 |
| Main | 24.3 | 20.1 | 14.8 | 15.3 | 20.2 | 21.1 | 24.9 |
| Side Stream 1 | 17.3 | | | | | | |
| Side Stream 2 | 17.2 | 12.7 | 13 | 17 | 17.6 | 19.5 | 16 |
| Side Stream 3 | N/A | 15.1 | 15.3 | 17.1 | 17.1 | 17.1 | 15.8 |
| Reactor Outlet | 28.4 | 20.8 | 20.9 | 24 | 24.3 | 27.4 | 25.8 |
| Residence Time, min. | | | | | | |
| to Side Stream 1 | 0.0245 | 0.0242 | 0.0243 | 0.0239 | 0.0301 | 0.0242 | 0.243 |
| to Side Stream 2 | 0.0669 | 0.0664 | 0.0645 | 0.0654 | 0.081 | 0.0661 | 0.0665 |
| to Side Stream 3 | 0.1455 | 0.0664 | 0.1054 | 0.1059 | 1.1728 | 0.1265 | 0.108 |
| to side Stream 4 | | | | | | | |
| Quench | 0.1839 | 0.1483 | 0.1395 | 0.1772 | 0.2168 | 0.1803 | 0.179 |
| 3/8-inch reactor | | | | | | |

TABLE 4B

Properties of PE-EP Block Polymers

| Sample | ML | Wt % Ethene Whole Polymer | % PE Block | Estimated Wt % Propene in PE Block | Tm PE Block | Heat of Fusion PE Block J/g | Tm EP Block °C. | Heat of Fusion EP Block J/g | TE | Mw × 10^-3 | Mw/Mn | Max in dI (m)/d log m |
|---|---|---|---|---|---|---|---|---|---|---|---|---|
| NDG 12 | 8.9 | 69 | 19.8 | 3.7 | 120 | 39 | 43 | 0.3 | 2.8 | 98 | 1.42 | 2.6 |
| NDG 29 | 7.4 | 69.7 | 18 | 5.7 | 116 | 33 | | 1.5 | 2.27 | 93 | | 2.05 |
| NDG 30 | 7.3 | 66.9 | 9.3 | 5.5 | 115 | 15 | | 0 | 2.28 | 95 | | 2.4 |
| NDG 31 | 10.6 | 72.5 | 21 | 5.2 | 118 | 37 | | 1.2 | 2.58 | 103 | | 2.0 |
| NDG 40 | 4.9 | 63.8 | 13.8 | | 128 | | | | | 68 | 1.49 | 2.46 |
| NDG 41 | 7.2 | 64.7 | 17.6 | | 126 | | | | | 89 | 1.69 | 2.06 |
| NDG 42 | 3.8 | 71.3 | 21.5 | | 128 | | | | | 68 | 1.61 | 2.43 |
| NDG 43 | 2.2 | 68.4 | 22.4 | | 125 | | | | | 61 | 1.46 | 2.59 |
| 5/14/96 13:30 | 6.2 | 70 | 15 | 6.5 | 109 | 28 | 47 | 6. | | | | 1.56 |
| 7/15/96 14:10 | 8.2 | 69 | 13 | 6.3 | 111 | 29 | 47 | 8. | | | | 1.53 |
| 9/24/96 14:40 | 13.3 | 69 | 17 | 4.7 | 117 | 36 | 46 | 3. | 2.6 | 115 | 1.82 | 1.67 |
| 9/24/96 15:10 | 13.9 | 70 | 21 | 4.0 | 120 | 38 | | | 2.75 | 113 | 1.81 | 1.68 |
| 9/24/96 15:40 | 14.9 | 70.3 | 20 | 5.5 | 115 | 37 | | | 3.05 | 118 | 1.86 | 1.55 |
| 9/24/96 16:30 | 12.6 | 69.7 | 20 | 5.0 | 117 | 36 | | | | 114 | 1.75 | 1.9 |
| 9/24/96 17:00 | 12.2 | 70. | 20 | 4.3 | 119 | 36 | 46 | 3. | 3.26 | 115 | 1.72 | 2.0 |
| 1/20/97 15:00 | 7.1 | 70 | 20 | 4.0 | 115 | 26 | 48 | 6. | 2.36 | 104 | 1.68 | 1.9 |
| 1/20/97 17:00 | 8.6 | 70.1 | 21 | 4.0 | | | | | 2.5 | 108 | 1.7 | 1.9 |
| 1/20/97 22:00 | 12.1 | 71 | 19 | 4.0 | 115 | 2.4 | 48 | 9. | | | | |
| 1/21/97 06:00 | 11.3 | 71 | 20 | 4.0 | 117 | 25 | 50 | 8. | | | | |
| 701204095 | 7 | 71 | 15 | 5.5 | 115 | 28 | 46 | 5. | 2.4 | 98 | 1.6 | |
| 701214280 | 12 | 71 | | 5.3 | 117 | 28 | 46 | 8. | 3.38 | 119 | 1.61 | |
| NDG 5 | 32 | 73 | 20 | 0 | 126 | 35 | | | 4.4 | 150 | 1.5 | 1.8 |
| NDG 7 | 2.3 | 73 | 20 | 0 | 126 | 36 | | | 2.1 | 72 | | 2.05 |
| 374B | | 76 | 49 | 0 | | | | | 3.7 | | | |
| 350E | 20 | 74 | 47 | 0 | 132 | 86 | | | 4.5 | 148 | 1.9 | — |
| 420A | | 72 | 44 | 0 | | | | | 3.0 | | | |
| 366B | | 71 | 40 | 0 | | | | | 3.3 | | | |
| 380B | | 71 | 36 | 0 | | | | | 4.1 | | | |
| 368C | | 70 | 34 | 0 | | | | | 3.76 | | | |
| VSV 10/29 | | 69 | 28 | 0 | | | | | 3.7 | | | |
| 318A | 11 | 64 | 14 | 0 | 127 | 28 | | | 2.8 | 118 | 1.7 | |
| 318B | 8 | 63 | 14 | 0 | 123 | 25 | | | 3.0 | 118 | 1.9 | |

During the polymer production process all samples were recovered from the solvent by steam distillation. All of the samples have a PE block melting point above 109° C. All samples (with the exception of the NDG-40-43 series, which were reactor sampled only) could be recovered by steam distillation without particle agglomeration problems, including samples down to Mw of 80K, unlike the polymers of Comparative Example 3.

Example 5

In this example selected samples prepared in Example 4 above were tested for SSI and high and low temperature viscometric properties. The oil formulation is as follows with the correct amount of polymer being added to get the correct 100° C. kv for the oil grade: Mobil 15W40, 71.2 wt % Mobil 150NS, 21.5 wt. % Mobil 300NS, 7.3 wt. % ESN 130, 0.22 wt % PARAFLOW 387.

TABLE 5

Properties of PE-EP Block Mix Free Reactor and Poly(ethene-co-propene) Polymers In Lubricating Oils

| Sample | TE | SSI % | PP °C. | TP1 cP | CCS cP | Haze | HTHS cP | Formulation | VI in Mobil Paulsboro* |
|---|---|---|---|---|---|---|---|---|---|
| NDG 12 | 2.8 | 18 | −27 | 9420 | 3160 | 16 | | Mobil 15W40 | 178 |
| NDG 12 | 2.8 | 18 | −33 | 8225 | 3090 | 15 | | Mobil 10W30 | |
| NDG 29 | 2.27 | 13 | | | | | | | 179 |

TABLE 5-continued

Properties of PE-EP Block Mix Free Reactor and Poly(ethene-co-propene) Polymers In Lubricating Oils

| Sample | TE | SSI % | PP °C. | TP1 cP | CCS cP | Haze | HTHS cP | Formulation | VI in Mobil Paulsboro* |
|---|---|---|---|---|---|---|---|---|---|
| NDG 30 | 2.28 | 12 | | | | | | | 145 |
| NDG 31 | 2.65 | 26 | | | | | | | 167 |
| 5/14/96 13:30 | 2.4 | 32 | | | | | | | |
| 7/15/96 14:10 | 2.47 | 25 | | | | | | | |
| 9/24/96 14:40 | 2.6 | 27 | | | | | | | |
| 9/24/96 15:10 | 2.75 | 32 | | | | | | | |
| 9/24/96 15:40 | 3.05 | 42 | | | | | | | |
| 9/24/96 17:00 | 3.26 | 49 | | | | | | | |
| 701204095 | 2.4 | 24 | −27 | 8870 | 3210 | 14 | 4.1 | Mobil 15W40 | |
| 701204095 | 2.4 | 24 | −30 | 9840 | 3075 | | 3.4 | Mobil 10W30 | |
| 701214280 | 3.38 | 41 | | | | | | | |
| 878 | 3.3 | 50 | −33 | 11,000 | 3000 | 180 | 2.5 | | 148 |
| 91-9 | 2.7 | 37 | −33 | 11,000 | 3200 | 140 | 2.8 | | 146 |

*Mobil Paulsboro is a basestock marketed by Mobil Oil Corp.

Viscosity Index (VI) is measured according to D2270-93. The higher the value the less the kinematic viscosity (kv) increases as temperature decreases.

When the results of this set of experiments is regressed the following interrelationship of SSI, TE and MWD is found:

$$\log SSI = 1.17 + (1.82 \pm 0.23) \log TE - (0.29 \pm 0.055) \text{ MWD Peak Max.}$$

The narrower the MWD, as measured by the height at peak max., the lower the SSI at a given TE.

Example 6

Figure 2:
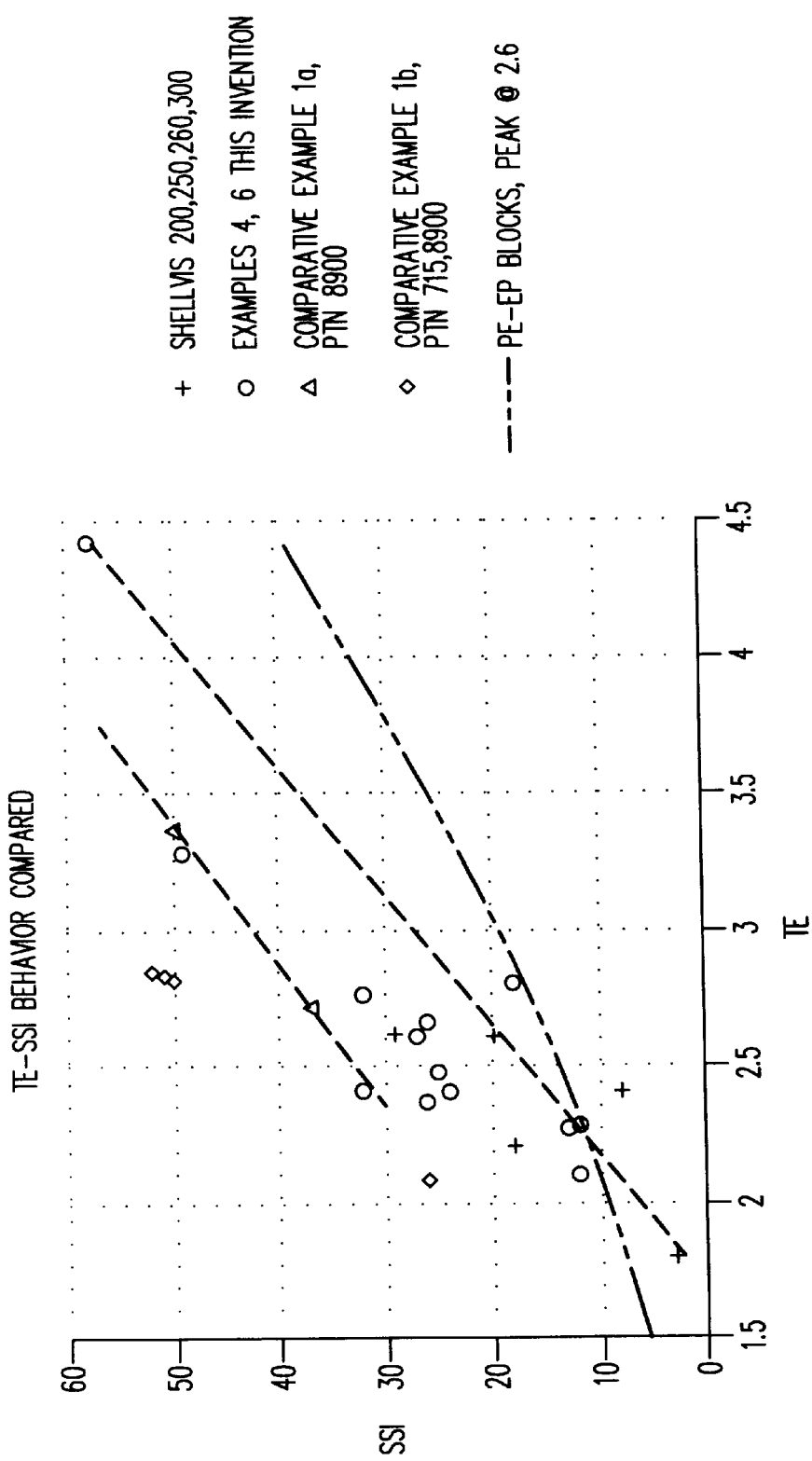
FIG. 2 shows a plot of SSI v. TE for the copolymers of the invention and the prior art as discussed in Example 6.

The TE-SSI performance of selected polymers from Comparative Example 1 and Example 5 is compared in FIG. 2. Also measured and included in the Figure is TE-SSI data for products currently marketed by Shell Chemical, Shellvis 200, 260 and 300. These are hydrogenated "star" branched polymers made anionically from polyisoprene. When hydrogenated they have the same composition as an alternating ethene propene copolymer (i.e. 50 mole % ethene) with a few percent isopropyl side groups from 3,4 isoprene addition in the anionic polymerization. These star branched polymers represent the most shear stable prior art polymer for their TE on the commercial market today. They get their stability from narrow MWD and the branched polymer structure which distributes the breaking stresses across the bonds in a different way than for linear polymers and also from the fact that when one "arm" is broken off such a structure the decrease in viscosity is not large. The alternate side of that behavior is that star molecules continue to degrade at a rather constant rate with time rather than reaching a steady viscosity as linear molecules which break at the center do. Once broken, linear molecules are much less susceptible to a second break than the stars which are not substantially altered by single breaks.

It is clear from FIG. 2 that the PE-EP block polymer (PE-EP blocks with peak max at 2.6 according to the regression equation of Example 5) provides a lower SSI for a given TE compared to the prior EP technology. The performance is as good as the Shell star polymers. It is the high ethene content of the PE-EP blocks which gives them the boost compared to previous EPs. Higher ethene content means fewer tertiary hydrogens in the polymer backbone, which yields greater carbon-carbon bond strength. At a given molecular weight, high ethene content polymers have a higher intrinsic viscosity and TE compared to low ethene content polymers. If a lower molecular weight polymer can be used to thicken the oil, a given weight of polymer will contain more molecules, and more bond breaks are needed to degrade the given weight of polymer. The credit can also be taken as less polymer is needed to thicken the oil at a given SSI. Oil performance is set by the SSI the marketer chooses to sell. If a higher TE polymer can be used at a given SSI, less polymer must be used. Polymer costs more than oil thus the PE-EP polymer is more cost effective.

Example 7

Figure 3:
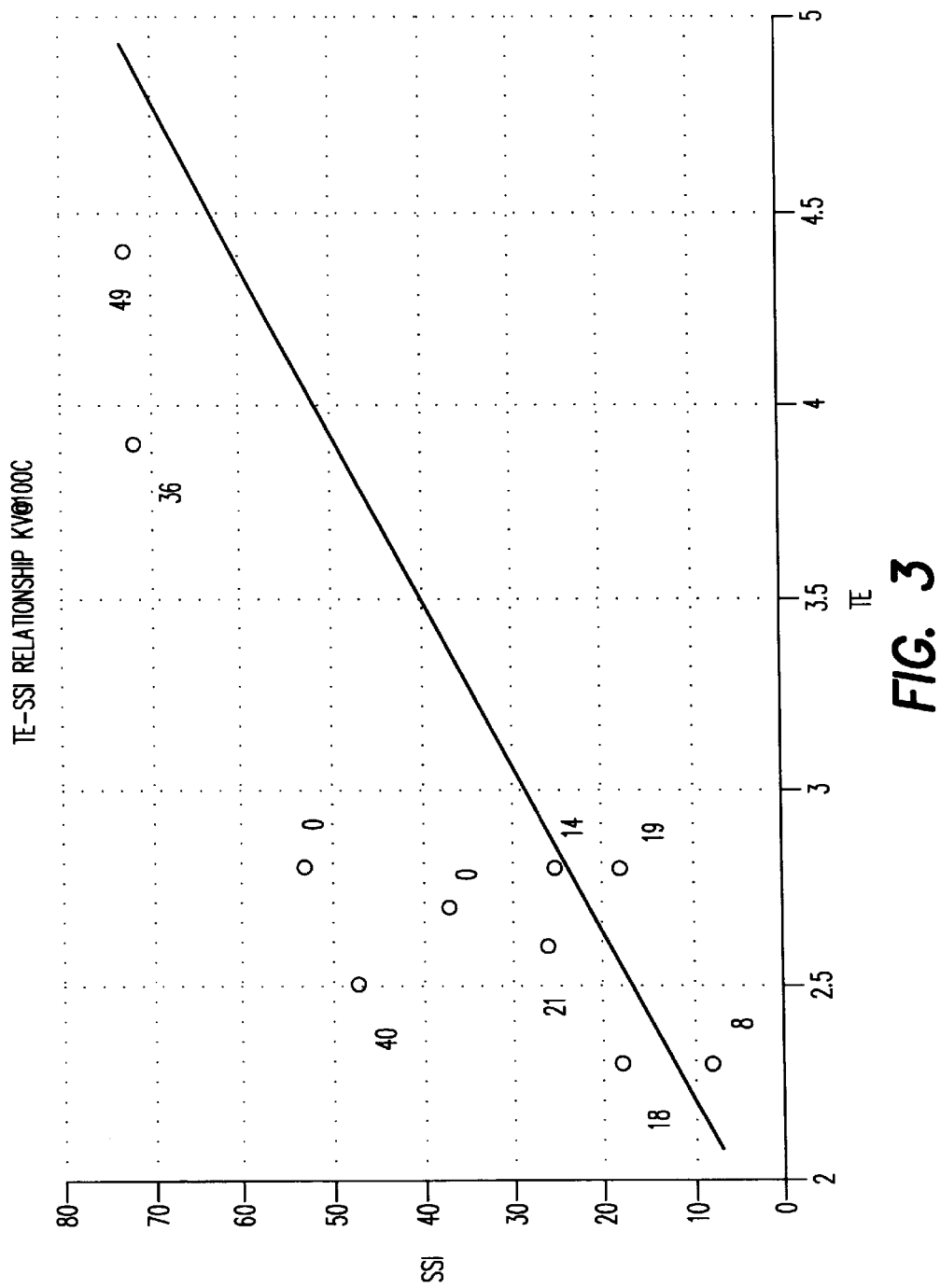
FIG. 3 shows a plot of Log SSI v. Log TE for the copolymers of the present invention with kv measured at 100° C., as discussed in Example 7.

In Table 7a the TE-SSI performance of several PE-EP block polymers of similar TE but varying PE block content is compared. It is seen in FIG. 3 (in which the numbers designate the ethene content of the samples) that as block content is increased performance increases as measured by higher TE at a given SSI. However above 25% PE block the trend reverses and SSI appears to increase disproportionately. Backmixed reactor polymers V457(PARATONE 715 is a solution of V457 in oil) and 90-9 are included for reference.

TABLE 7A

TE-SSI Performance of PE-EP Block Polymers vs PE Block Content

| Sample | ML @ 150 C | Wt % Ethene Whole Polymer | % PE Block | Wt % Propene in PE Block | TE @ 100 C | SSI TE @ 100 C | SSI TE @ 150 C | Ratio of SSI 100 C/ 150 C | d in K/ dT before KO x $10^3$ | d in K/ dT after KO x $10^3$ | PE Block Too Large? |
|---|---|---|---|---|---|---|---|---|---|---|---|
| V457   | 15*   | 44   | 0  | na  | 2.8 | 53 | 50 | 1.06 | −3.0 | −1.8 | no  |
| 90-9   | 9.5*  | 65   | 0  | na  | 2.7 | 40 | 40 | 1.0  | −2.4 | −2.3 | no  |
| NDG 30 | 11    | 64   | 8  | 4   | 2.3 | 8  |    |      |      |      | no  |
| 318A   | 11    | 64   | 14 | 0   | 2.8 | 25 | 26 | 0.96 | −4.3 | −3.6 | no  |
| NDG 12 | 9     | 69   | 19 | 4   | 2.8 | 18 | 18 | 1.0  |      |      | no  |
| NDG 29 | 7.4   | 70   | 18 | 5   | 2.3 | 18 |    |      |      |      | no  |
| NDG 31 | 10.6  | 72   | 21 | 5.2 | 2.6 | 26 | 27 | 0.96 |      |      | no  |
| 380B   | 97    | 71.4 | 36 | 0   | 3.9 | 72 | 53 | 1.36 | −8.3 | 1.8  | yes |
| 366B   | 23    | 71   | 46 | 0   | 2.5 | 47 | 16 | 2.9  | −6.9 | 2.2  | yes |
| 374B   | 93    | 76   | 49 | 0   | 4.4 | 73 | 46 | 1.59 | −6.7 | 7.0  | yes |

*ML @ 125° C.

Figure 4:
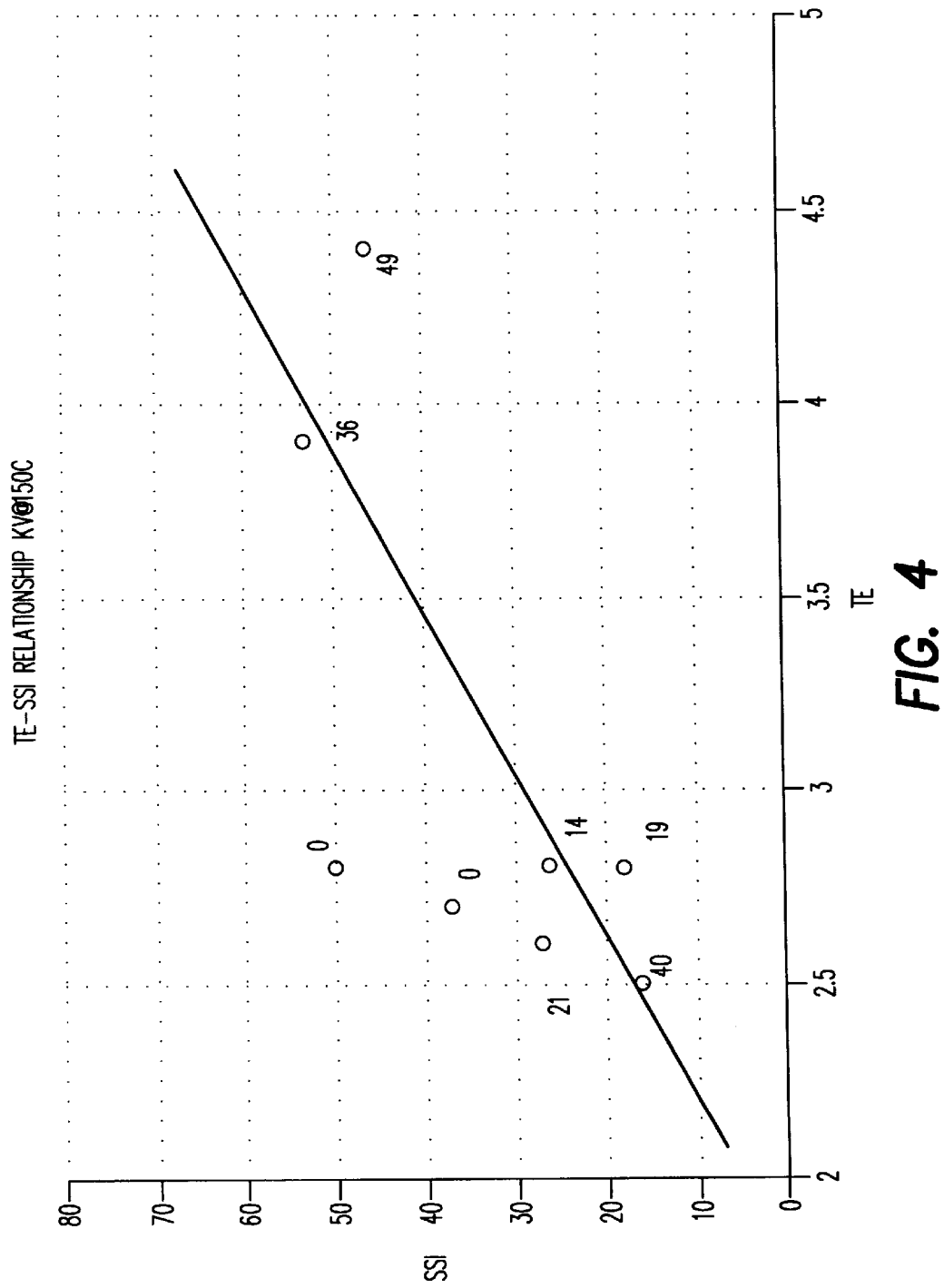
FIG. 4 shows a plot of Log SSI v. Log TE for the copolymers of the present invention with kv measured at 150° C., as discussed in Example 7.

However, if the kinematic viscosities before and after degradation are measured at 150° C. instead of the standard 100° C., the SSI is seen to be small for the high block content polymers, as shown in FIG. 4 (in which the numbers designate the ethene content of the samples). There are more high block content polymers to the right in FIG. 4 than in FIG. 3. The ratio of the two SSIs is shown in the Table 7a.

If the molecular weight of the degraded polymer is measured it is seen that even though the TE has dropped considerably for the high PE block content polymers after KO treatment when kinematic viscosity is measured at 100° C., the Mw has not dropped and an SSI based on molecular weights would show those samples to be good performers.

Figure 5:
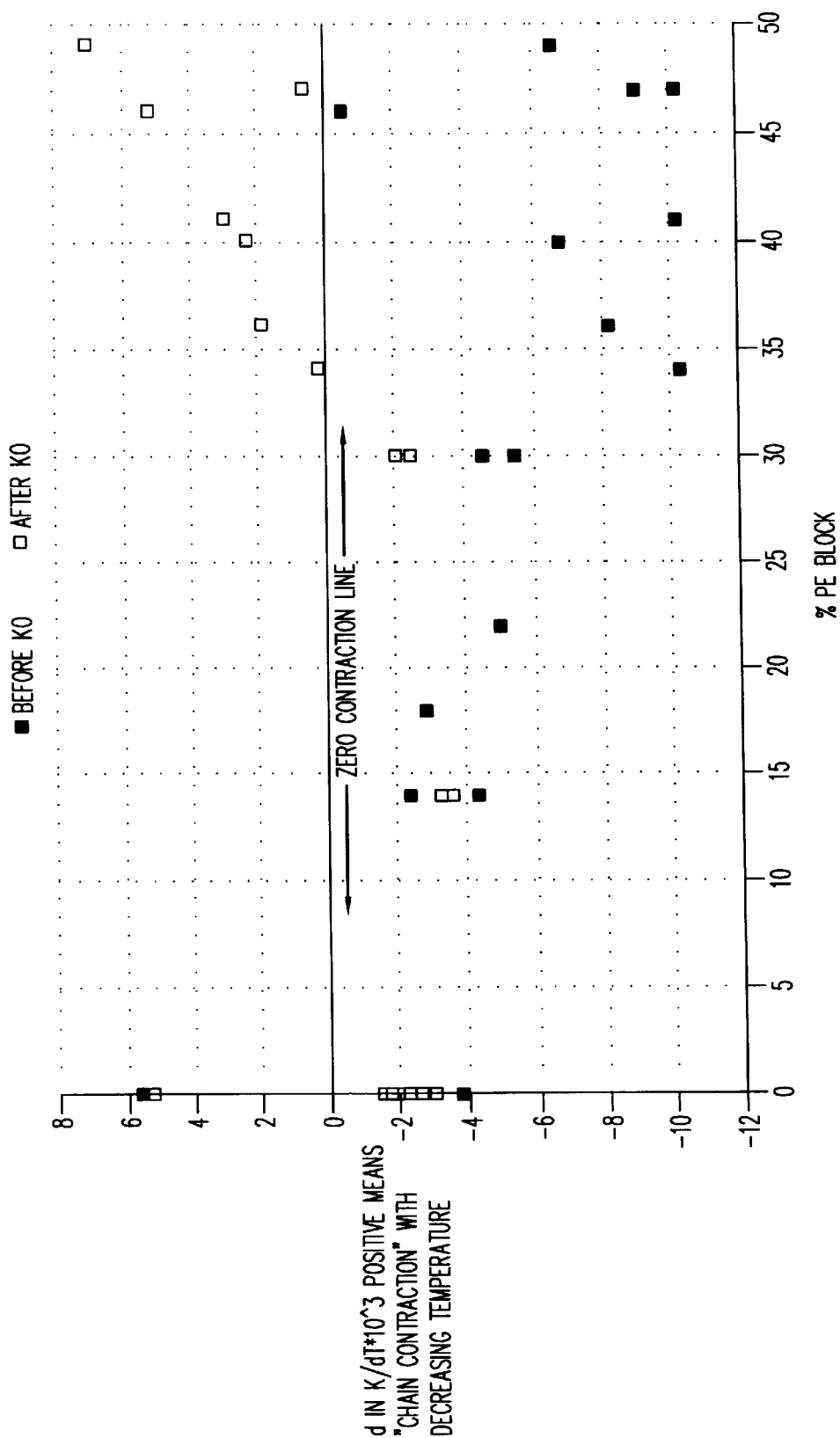
FIG. 5 shows a plot of "Chain Contraction" v. % PE Block before and after KO for the copolymers of the present invention, as discussed in Example 7.

The data of FIG. 5 illustrates the poor SSI performance for polymers having a PE block content that is greater than, or equal to, 30 wt. %. The polymer contribution to the kinematic viscosity of the oil solution is proportional to the concentration and intrinsic viscosity of the polymer. In turn, the intrinsic viscosity is proportional to the size of the polymer molecule in solution. It is known that the size of properly dissolved PE and EP decreases as the temperature is raised. The higher the ethene content, the larger the change, as shown by the filled symbols of FIG. 5. When the polymer molecules are degraded, the molecules having a high PE block content will have fragments that are substantially pure PE block. Such molecules are not soluble in oil at 100° C. Thus the contribution of these molecules to the kinematic viscosity of the oil is greatly reduced. As shown in FIG. 5, after degradation, those polymers containing 25 to 30 wt. % PE block actually expand as the temperature is increased. This behavior reflects the increased solubility of the precipitated PE block as the temperature is raised and the PE blocks melt. Therefore, the PE block content should be below 25 to 30 wt. % for optimal apparent SSI performance, and above 5 to 10 wt. % for slurry stability during manufacturing.

Example 8

In this example samples with varying PE block content and Tm are compared regarding performance in the solvent stripping and slurrying operations of manufacture. Results are shown in Table 8.

TABLE 8

Steam Distillation Performance of PE-EP Block Polymers vs PE Block Content

| Sample | ML | SSI in ENJ102 | % PE Block | Wt % Propene in PE Block | Tm C | Polymer Viscosity @ 110 C $10^6$ poise | Operation Of Steam Distillation Unit |
|---|---|---|---|---|---|---|---|
| Vistalon 878 | 55 @ 125 C | 50 | 0  | —  | <70 | 5     | Excellent    |
| 90-9         | 20         | 30 | 0  | —  | <70 | 1     | Satisfactory |
| BR730        | 12         | 24 | 0  | —  | <70 | <0.1  | Inoperable   |
| NDG 9A       | 10 @ 150 C | 20 | 4  | 0  | 115 | 0.5   | Poor         |
| NDG 30       | 7.3        | 12 | 15 | 5  | 123 | >100  | Excellent    |
| NDG 12       | 8.9        | 19 | 20 | 5  | 123 | >100  | Excellent    |
| NDG 29       | 7.4        | 13 | 25 | 5  | 123 | >100  | Excellent    |
| 95-9 A       |            |    | 20 | 3  | 118 | >100  | Excellent    |
| 95-9 B       | 12         | 45 | 20 | 5  | 113 | >100  | Excellent    |
| 95-9 C       |            |    | 20 | 7  | 108 | <0.1  | Inoperable   |
| 95-9 D       | 7          | 24 | 18 | 5  | 115 | >100  | Excellent    |

*To be rated Excellent, the rubber particle size in the steam flash tank must show no tendency to agglomerate to form particles having a diameter that is larger than 1 to 2 cm. To be rated Satisfactory, the particles must not agglomerate when a slurry aid such as calcium stearate is used in an amount of 0.5 wt. %. Inoperable means that the steam flash tank is plugged with rubber as soon as the polymer is flashed into the tank, causing the shutdown of the process.

It is seen that the performance is determined by a combination of Tm and molecular weight as determined measured by Mooney viscosity. For the traditional mix free reactor polymers below about 20 ML and 30 SSI, the bulk viscosity is too low and the process will not operate. On the other hand when a high melting PE block is present with a Tm above 110° C. the process operates down to 7 ML (150° C.) producing a polymer of 24 SSI, which is not possible without the PE block's presence.

There is a balance between block length and Tm but there must be at least 10% PE block length present to have an operable process.

peak value first increases as feed temperature and outlet temperature decrease, but then begins to decrease at a temperature of 1.0° C.

Certain experiments reported in Table 9 were conducted in a one inch reactor using various feed temperatures, polymer concentrations and reactor times. The MW peak value was shown to increase as each of feed temperature, polymer concentration and reaction time was reduced. The highest value for MW peak was obtained when all three parameters were at their lowest level simultaneously. From these examples, it is clear that a preferred range of reactor conditions exist for producing polymer products with the desired SSI and TE characteristics.

TABLE 9

| Sample | Mooney | Main Feed T deg ° C. | Polymer Conc. wt/100 wt hexane | Reactor Outlet T ° C. | Reaction Time (sec) | Mw/Mn | MWD Peak Max |
|---|---|---|---|---|---|---|---|
| FIVE INCH REACTOR | | | | | | | |
| 9/24/96 14:40 | 13.3 | 10 | 6.15 | 48 | 7.43 | 1.84 | 1.68 |
| 9/24/96 15:40 | 14.9 | 10 | 4.96 | 42 | 7.62 | 1.87 | 1.55 |
| 9/24/96 16:30 | 12.6 | 10 | 3.54 | 24 | 7.62 | 1.76 | 1.91 |
| 1/22/97 22:00 | 12.1 | 11.5 | 5.50 | 37.0 | 2.64 | 1.83 | 1.85 |
| 1/23/97 00:45 | 10.8 | 9 | 5.50 | 37.0 | 2.64 | 1.71 | 1.93 |
| 1/23/97 01:35 | 9.1 | 6 | 5.50 | 33.5 | 2.64 | 1.70 | 1.97 |
| 1/23/97 04:00 | 9.6 | 1 | 5.50 | 33.5 | 2.64 | 1.78 | 1.86 |
| ONE INCH REACTOR | | | | | | | |
| NDG 44 | 21.9 | 10 | 3.28 | 40.0 | 8.05 | 1.71 | 1.78 |
| NDG 45 | 27.4 | 25 | 3.04 | 45.4 | 8.05 | 1.92 | 1.46 |
| NDG 46 | 10.1 | 25 | 2.62 | 39.1 | 4.03 | 1.79 | 1.83 |
| NDG 47 | 5.7 | 10 | 2.95 | 32.8 | 4.03 | 1.49 | 2.41 |

Example 9

In this example the SSI performance of PE-EP block polymers is examined as a function of the process conditions employed to make the polymer.

At a given TE the SSI is lower the narrower the MWD of the polymer. Empirically it was shown in Example 5 that the maximum value for the derivative of the integral of the molecular weight distribution, d I(M)/d log M, is a predictive measure of the effect of MWD on SSI at a given TE. The larger the value for this quantity the lower the SSI at a given TE.

Table 9 presents MWD information, and thus SSI predictions, as a function of the relevant polymerization variables. Specifically, polymerization data for a number of the runs shown in Table 4a are set forth in Table 9 to demonstrate the criticality of reactor conditions on the preferred narrow molecular weight distribution and TE and SSI characteristics of the resulting copolymers. The three runs identified as Sep. 24, 1996 differ primarily in polymer concentration at the reactor outlet. It can be seen from the MWD peak measurements that the highest MW peak is obtained at low polymer concentration, which also corresponds to low reactor outlet temperature.

The four runs labeled Jan. 22, 1997 and Jan. 23, 1997 differ primarily in reactor feed temperature, which was varied from 1.0 to 11.5° C. The MW peak value goes through a maximum as feed temperature is reduced. MW For practical operation it appears that the cement concentration should be below 6% and the inlet temperature above 5° C. with the outlet temperature below 40° C.

Furthermore it is advantageous from a MWD and SSI performance to quench the reaction before significant monomer transfer occurs. Too early a quench however reduces production rate and an optimum must be found to produce the most cost effective product.

Sidestream location must not be too late or significant termination or transfer reactions can occur leaving molecules which have the molecular length associated with the subsequent sidestream feed unattached to the molecule. An MWD with a series of modes can be created. Fragments of unattached PE and EP are created which fragments perform in an inferior manner as far as TE-SSI and low temperature properties are concerned.

Example 10

Figure 6:
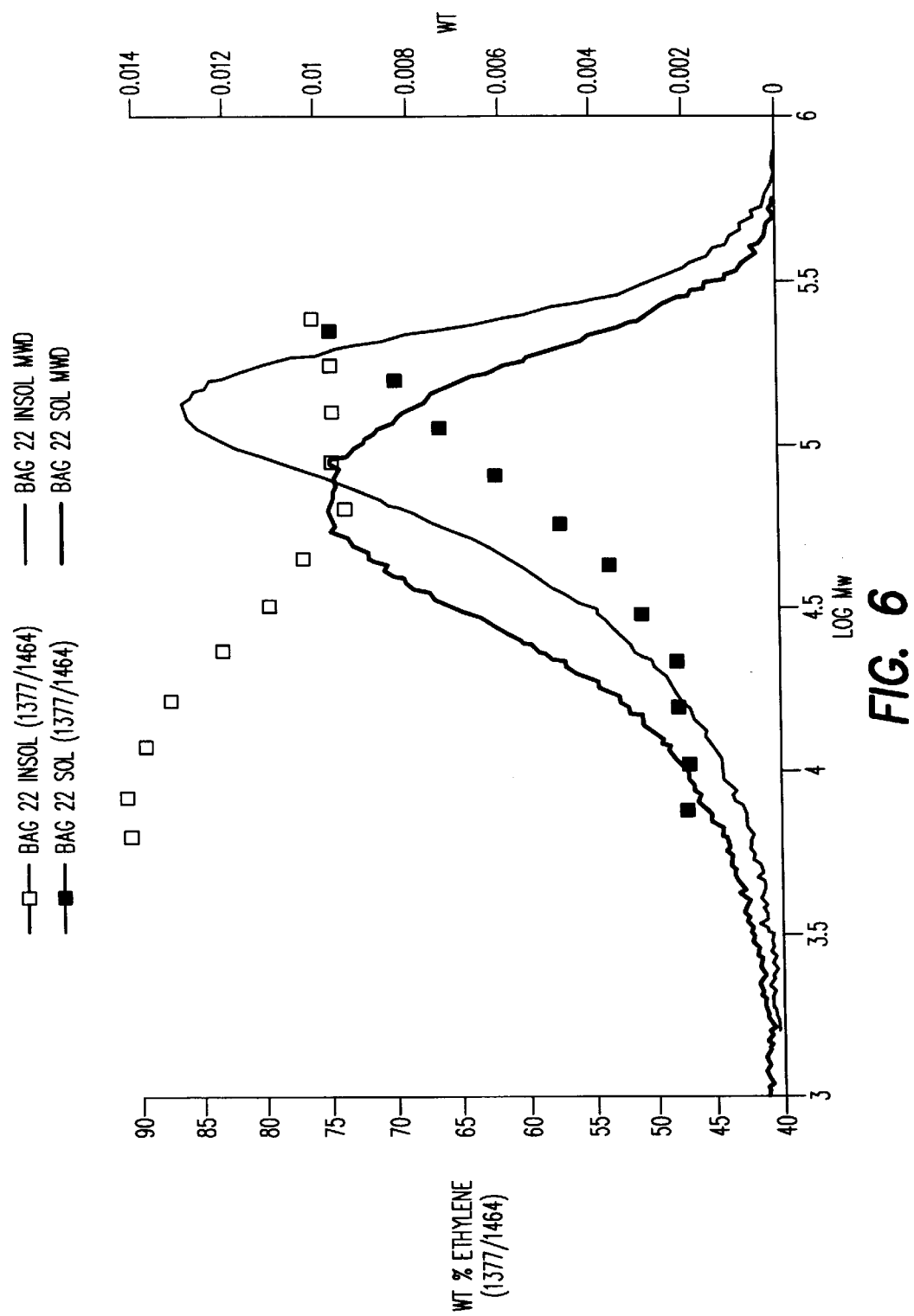
FIG. 6 shows a plot of wt. % ethylene of the polymer at a particular molecular weight v. Log MW, as discussed in Example 10.
Figure 7:
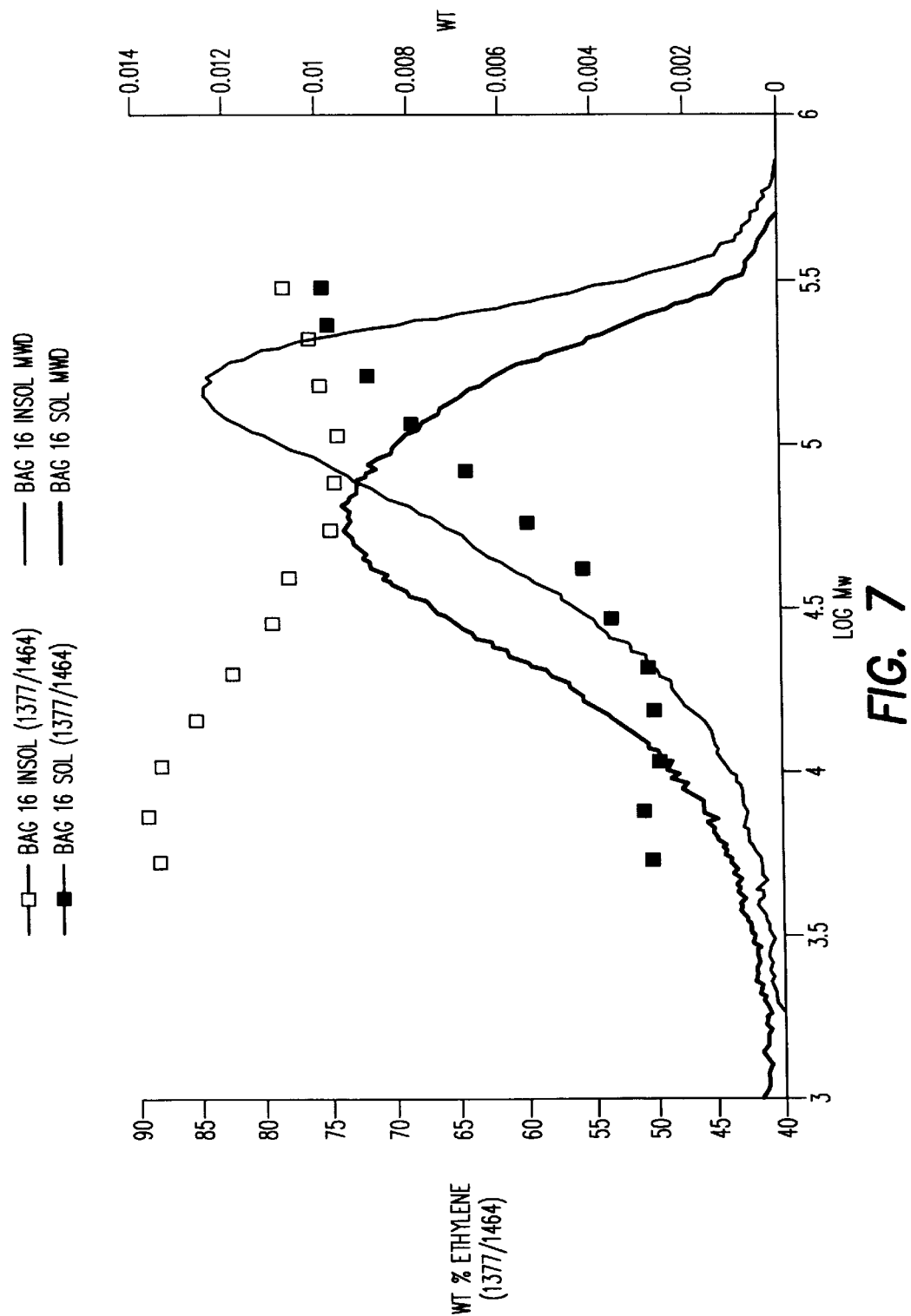
FIG. 7 shows a plot of wt. % ethylene of the polymer at a particular molecular weight v. Log MW, as discussed in Example 10.
Figure 8:
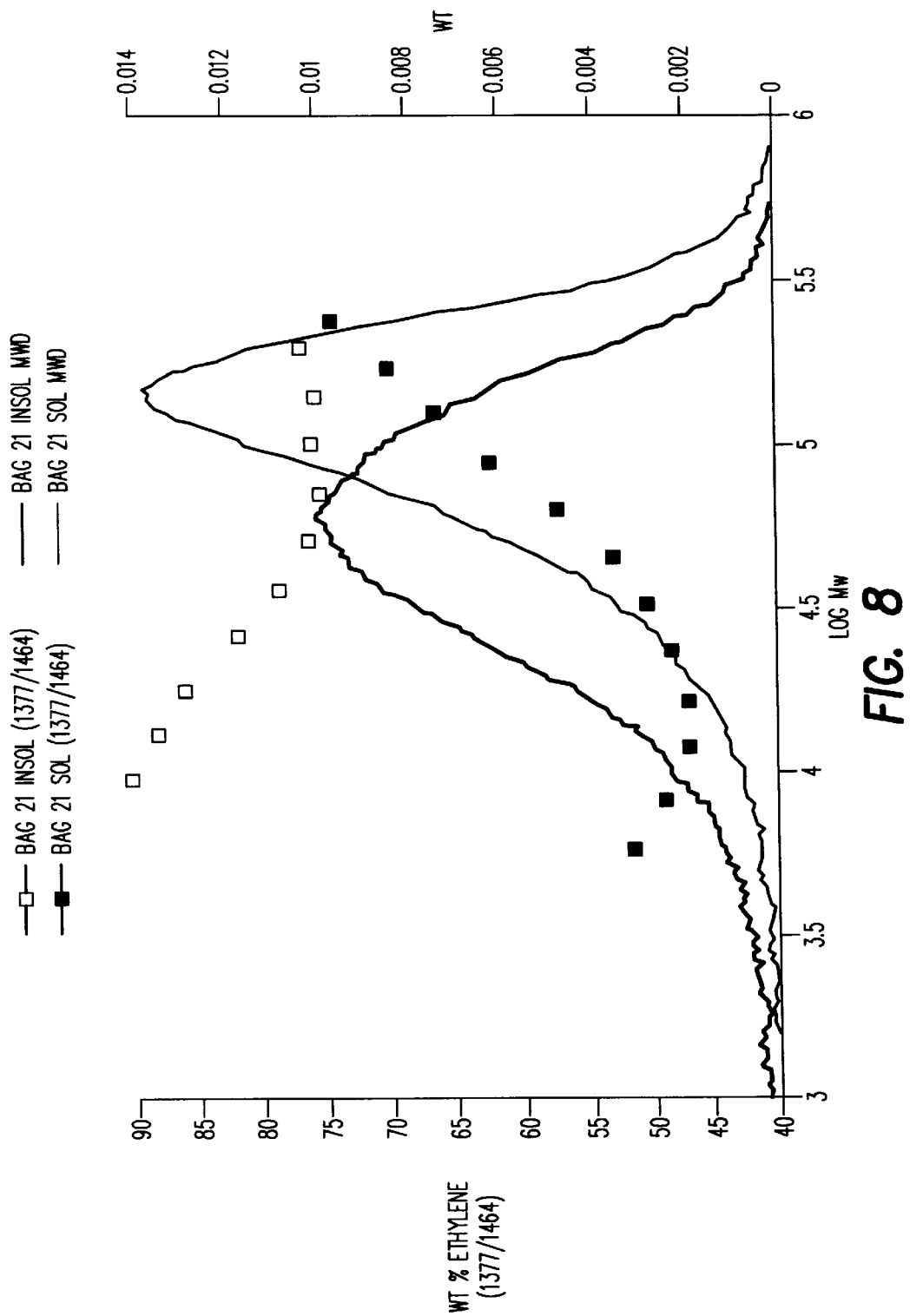
FIG. 8 shows a plot of wt. % ethylene of the polymer at a particular molecular weight v. Log MW, as discussed in Example 10.

In this example selected polymers from Example 4 are characterized with regard to compositional distribution (CD), and how pure the PE-EP block structure is. Samples were extracted with cyclohexane at 55° C. as described in Example 4, section g. Soluble and insoluble fractions were as shown in Table 10. The soluble and insoluble fractions were subjected to GPC with on line FTIR analysis to obtain the ethene content. Typical results are shown in FIGS. 6, 7 and 8.

TABLE 10

| Sample | % Soluble | Insoluble Fraction Wt. % Ethene | Mw | Mw/Mn | Mp | Soluble Fraction Wt. % Ethene | Mw | Mw/Mn |
|---|---|---|---|---|---|---|---|---|
| 1/21/97 01:35 Re | 15.4 | 73 | 115 | 1.56 | 1.56 | 60 | 69 | 2.2 |
| 1/21/97 06:00 Re | 11.7 | 71 | 124 | 1.47 | 2.25 | 68 | 68 | 2.1 |
| 1/20/97 15:00 FD | 17.7 | 72 | 107 | 1.58 | 1.58 | 71 | 71 | 1.9 |
| 1/21/97 04:00 FD | 17.9 | 73 | 119 | 1.58 | 1.58 | 75 | 75 | 2.1 |

It is seen that the soluble portion ranges from 11 to 18%. The average composition is about 60 weight % ethene. The insoluble fraction has an ethene content of about 72%.

The GPC data shows the weight average molecular weight, Mw, of the soluble fraction to be about 70,000 and the insoluble fraction to be about 115,000. There is a shift in the MWD peak to lower molecular weight in the soluble fraction from over 100,000 to less than that value. Although applicants do not wish to be bound by any one theory, this is consistent with the absence of a PE block in the soluble portion and its formation by a transfer reaction after most of the mainstream ethene was consumed.

The FTIR data in FIGS. 6 through 8 show that the low molecular weight 10 portion of the MWD of the soluble fraction is about 45 weight % ethene and the composition rises with molecular weight to a value of about 60 weight % at the maximum in the MWD. Still higher molecular weight soluble fraction reaches the average of the whole polymer at about 70 weight %. There may be some small amount of PE block in the soluble fraction which tends to raise the ethene content of the highest molecular weight fraction.

The insoluble fraction has the correct average ethene content for the whole polymer across the main peak as expected. At low molecular weight the composition trends towards that of the PE block alone, above 90% ethene. Apparently some portion of the polymer chains stop growing before or soon after the first sidestream feed.

While several embodiments in accordance with the invention have been shown and described, it is to be clearly understood that the same are susceptible to numerous changes apparent to one of ordinary skill in the art. Therefore, the invention should not be deemed to be limited to the details shown and described above, and should be considered to show all changes and modifications which come within the scope of the appended claims.

What is claimed is:

1. A viscosity modifier comprising a block copolymer including A blocks and B blocks, wherein said A blocks comprise at least about 93 wt. % ethylene and said B blocks comprise a copolymer of between about 40 wt. % to 85 wt. % ethylene and at least one other α-olefin;
   wherein the resulting block copolymer has an average ethylene content of between about 60 wt. % to 80 wt. %; and wherein said viscosity modifier exhibits the following properties: at a thickening efficiency of 2.3, a Kurt Orbahn Shear Stability of less than about 25%; and at a thickening efficiency of 3.5, a Kurt Orbahn Shear Stability of less than about 35%.

2. The viscosity modifier according to claim 1, wherein said viscosity modifier has a bulk viscosity greater than $10^6$ poise at 110° C., measured at a strain rate of $10^{-3}$ sec$^{-1}$ or less.

3. The viscosity modifier according to claim 1, wherein said viscosity modifier has a weight average molecular weight between about 60,000 and 150,000.

4. The viscosity modifier according to claim 1, wherein said α-olefin is propylene.

5. The viscosity modifier according to claim 1, wherein said block copolymer comprises less than about 25 wt. % of said A block.

6. The viscosity modifier according to claim 1, wherein said block copolymer comprises less than 25 wt. % free B block that is extractable by cyclohexane at a temperature of 45–60° C.

7. The viscosity modifier according to claim 1, wherein said block copolymer comprises less than 20 wt. % free A block, as determined by Gel Permeation Chromatography-Fouier Transform-Infra Red Spectroscopy on a copolymer sample from which free B block has been previously extracted with cylcohexane at a temperature of 45–60° C.

8. The viscosity modifier of claim 7, wherein said block copolymer comprises less than 10 wt. % free A block.

9. The viscosity modifier of claim 1, wherein said block copolymer has a degree of crystallinity at 20° C. such that said copolymer has crystalline polyethylene domains with dimensions greater than 0.5 μm.

10. A lubricant composition comprising:
   (A) a synthetic oil and/or a natural oil base stock; and
   (B) a viscosity modifier comprising a block copolymer including an A block and a B block, wherein said A block comprises at least about 93 wt. % ethylene and said B block comprise a copolymer of between about 40 wt. % to 85 wt. % ethylene and at least one other α-olefin; wherein the resulting block copolymer has an average ethylene content of between about 60 wt. % to 80 wt. %; and wherein said viscosity modifier exhibits the following properties: at a thickening efficiency of 2.3, a Kurt Orbahn Shear Stability of less than about 25%; and at a thickening efficiency of 3.5, a Kurt Orbahn Shear Stability of less than about 40%.

11. The lubricant composition according to claim 10, wherein said viscosity modifier has a weight average molecular weight of about 60,000 to 150,000.

12. The lubricant composition according to claim 10, wherein said α-olefin is propylene.

13. The lubricant composition according to claim 10, wherein said block copolymer comprises less than about 25 wt. % of said A block.

14. The lubricant composition according to claim 10, wherein said lubricant is selected from the group consisting of crankcase oils, hydraulic fluids, turbine oils, gear oils, functional fluids, industrial oils and catapult oils.

15. The lubricant composition according to claim 10, wherein said block copolymer comprises between about 15 to 25 wt. % of said A block.

16. The lubricant composition according to claim 10, wherein said block copolymer comprises less than 25 wt. % free B block that is extractable by cyclohexane at a temperature of 45–60° C.

17. The lubricant composition according to claim 16, wherein said block copolymer comprises less than 15 wt. % free B block.

18. The lubricant composition according to claim 10, wherein said block copolymer comprises less than 10 wt. % free A block, as determined by Gel Permeation Chromatography-Fourier Transform Infra Red Spectroscopy on a copolymer sample from which free B block has been previously extracted with cyclohexane at a temperature of 45–60° C.

19. A viscosity modifier comprising a block copolymer including A blocks and B blocks, wherein said A blocks comprise at least about 92 wt. % ethylene and said B blocks comprise a copolymer of between about 40 wt. % to about 85 wt. % ethylene and at least one other α-olefin;

said block copolymer being formed by a process comprising the steps of:

(a) forming a catalyst by premixing the reaction product of a vanadium compound represented by one of the following formulas:

(1)

$$VCl_x(COOR)_{3-x} \quad (2)$$

where x=0 to 3 and R=a hydrocarbon radical;

$$VCl_4 \quad (3)$$

$$V(AcAc)_3$$

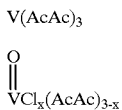

where AcAc=acetyl acetone; and where x=1 or 2; and $$VCl_3 \cdot nB$$

wherein n=2 to 3 and B=a Lewis base capable of making hydrocarbon soluble complexes with $VCl_3$, R preferably represents $C_1$ to $C_{10}$ aliphatic, alicyclic, or aromatic hydrocarbon radical;

and an organoaluminum compound selected from the group consisting of $AlR_3$, $AlR_2X$, $AlR'RX$, $Al_2R_3X_3$, $AlRX_2$, $Al(OR')R_2$, $R_2Al$—O—$AlR_2$ and methyl alumoxane, wherein R and R' represent hydrocarbon radicals, R and R' being the same or different, and wherein X is a halogen selected from the group consisting of bromine, chlorine, and iodine;

(b) feeding the reaction product of step (a) to a reactor concurrently with a monomer stream comprising ethylene; and (c) feeding at least a second monomer stream comprising ethylene and at least one α-olefin other than ethylene to the reactor at a time at which ethylene conversion in the main feed reaches about 85–90%;

wherein the resulting block copolymer has an average ethylene content of between about 60 wt. % to 80 wt. %; and wherein said viscosity modifier exhibits the following properties: at a wherein the resulting block copolymer has an average ethylene content of between about 60 wt. % to 80 wt. %; and wherein said viscosity modifier exhibits the following properties: at a thickening efficiency of 2.3, a Kurt Orbahn Shear Stability of is less than about 25%; and at a thickening efficiency of 3.5, a Kurt Orbahn Shear Stability of is less than about 35%.

* * * * *